United States Patent [19]
Tsutsui

[11] Patent Number: 6,029,136
[45] Date of Patent: Feb. 22, 2000

[54] BAND DIVIDING/SYNTHESIZING FILTER WITH REDUCED MEMORY REQUIREMENTS

[75] Inventor: Kyoya Tsutsui, Kanagawa, Japan

[73] Assignee: Sony Corporation, Tokyo, Japan

[21] Appl. No.: 08/744,365

[22] Filed: Nov. 7, 1996

[30] Foreign Application Priority Data

Nov. 21, 1995 [JP] Japan .................................. 7-303072

[51] Int. Cl.[7] .................................................. G10L 9/00
[52] U.S. Cl. ........................ 704/500; 704/229; 704/204
[58] Field of Search .................................. 704/500, 229, 704/204, 221

[56] References Cited

U.S. PATENT DOCUMENTS

| | | | |
|---|---|---|---|
| 5,471,558 | 11/1995 | Tsutsui | 704/219 |
| 5,530,750 | 6/1996 | Akagiri | 380/4 |
| 5,566,154 | 10/1996 | Suzuki | 704/229 |
| 5,590,108 | 12/1996 | Mitsuno et al. | 704/229 |
| 5,610,944 | 3/1997 | Mau et al. | 375/260 |
| 5,619,570 | 4/1997 | Tsutsui | 380/4 |
| 5,623,577 | 4/1997 | Fielder | 704/229 |
| 5,642,111 | 6/1997 | Akagiri | 704/229 |
| 5,664,056 | 9/1997 | Akagiri | 704/229 |
| 5,680,130 | 10/1997 | Tsutsui et al. | 704/501 |
| 5,717,821 | 2/1998 | Tsutsui et al. | 395/2.14 |
| 5,724,612 | 3/1998 | Haneda et al. | 395/853 |
| 5,731,767 | 3/1998 | Tsutsui et al. | 341/50 |
| 5,737,718 | 4/1998 | Tsutsui | 704/205 |
| 5,752,224 | 5/1998 | Tsutsui et al. | 704/225 |
| 5,754,127 | 5/1998 | Tsutsui et al. | 341/54 |
| 5,754,501 | 5/1998 | Tsutsui | 369/32 |
| 5,758,020 | 5/1998 | Tsutsui | 395/213 |

*Primary Examiner*—David R. Hudspeth
*Assistant Examiner*—Susan Wieland
*Attorney, Agent, or Firm*—Limbach & Limbach L.L.P.

[57] ABSTRACT

A coding process having a band dividing filter and a decoding process having a subband synthesizing filter are arranged so that the operating accuracy is enhanced only in a specific subband, for securing the necessary sound quality with a relatively small amount of the operation. A band dividing control unit is served to derive a signal level of each subband from the output result of a fast band dividing filter and generate a high-accurate operation band specifying command for specifying a subband of a low signal level. A high-accuracy band dividing filter is executed to perform a band dividing operation for the subband of the low signal level specified by the high-accuracy band specifying command.

14 Claims, 18 Drawing Sheets

BAND DIVIDING/SYNTHESIZING FILTER WITH REDUCED MEMORY REQUIREMENTS

BACKGROUND OF THE INVENTION

1. Field of the Invention

The present invention relates to a high-efficient coding and decoding technique which is arranged to high-efficiently code input data, transmit, record, reproduce and decode the digital data for producing a regenerative signal.

2. Description of the Related Art

There have been various kinds of techniques for high-efficiently coding an audio or voice signal. For example, a subband coding (SBC) employing a nonblocking frequency band dividing system or a blocking frequency band dividing system, that is, the so-called coding transform may be referred. The former technique is arranged to divide a time-base signal such as an audio signal into plural frequency subbands without blocking the signal and to code it. The latter technique is arranged to transform (spectrum-transform) a time-base signal into a frequency-base signal, divide the transformed signal into plural frequency subbands, and code each frequency subband.

Further, another high-efficient coding technique may be considered by combining the foregoing band divisional coding with the coding transform. This technique is arranged to divide the signal into frequency subbands, spectrum-transform the signal of each subband frequency into the frequency-base signal, and code the spectrum-transformed band signal. The foregoing process for dividing the signal into frequency subbands is executed by a filter such as a QFM filter. This QFM filter is discussed in 1976 R. E. Crochiere Digital coding of speech in subbands, Bell Syst. Tech, J. Vol. 55, No. 8, 1976.

Moreover, a technique of dividing a signal into equal subband widths through a filter is discussed in ICASSP 83, BOSTON Polyphase Quadrature filters-A new subband coding technique, Joseph H. Rothweiler. The foregoing spectrum transform from the time base to the frequency base may be executed by blocking an input signal such as an audio signal at a given unit time (frame) and performing Discrete Fourier Transform (DFT), Discrete Cosine Transform (DCT) or modified DCT transform (MDCT) or the like.

The modified DCT transform is discussed in ICASSP 1987 Subband/Transform Coding Using Filter Bank Designs Based on Time Domain Aliasing Cancellation, J. P. Princen A. B. Bradley, Univ. of Surrey, Royal Melbourne Inst. of Tech.

As mentioned above, the audio or voice signal is divided into subbands through the effect of the filter or spectrum transform before quantization. This makes it possible to suppress the subband where quantizing noises take place and to more high-efficiently code the signal from an acoustic point of view by using a property such as a masking effect.

Before the quantization, each subband may be normalized with a maximum of an absolute value of signal components of the band, for making the coding more high-efficient.

When quantizing the frequency component of each band, the human acoustic characteristic, for example, is considered for the band division. That is, in general, the audio signal may be divided into subbands (for example, 25 subbands) each of which has a wider highband width and is called a critical band. When coding the data of each band, the coding is based on a given bit allocation or an adaptive bit allocation for each band.

For example, when coding the coefficient data derived by the MDCT process through the bit allocation, the MDCT coefficient data, which is derived by the MDCT process of each block, is coded at an adaptive allocated bit number. There have been known the following two techniques as the bit allocation.

At first, the bit allocation is based on a magnitude of a signal of each band. This technique is discussed in: Adaptive Transform Coding of Speech Signals, R. Zelinski and P. No11, IEEE Transactions of Acoustics, Speech, and Signal Processing. This technique is executed so that the quantizing noise spectrum is made flat and thus the noise energy is made minimum. However, no use of the masking effect lowers the actual acoustic sense.

Second, the fixed bit allocation may be referenced. This bit allocation utilizes the acoustic-sense masking for deriving an S/N ratio for each band. This technique is discussed in: ICASSP 1980, The critical band coder—digital encoding of the perceptual requirements of the auditory system, M. A. Kransner MIT. However, this technique does not offer so excellent a characteristic value when measuring the characteristic with the sinusoidal waveform input, because the bit allocation is fixed at each band.

To overcome these shortcomings, there has been proposed a high-efficient coding apparatus which is arranged to divide all the bits to be used for the bit allocation into the bits for a given fixed bit allocation pattern for each subblock and the bits for the bit allocation depending on the magnitude of the signal of each block and to make a divisional ratio to the fixed bit allocation pattern as the spectrum of the signal is made smooth.

With this method, if energy is concentrated on a specific spectrum, such as a sinusoidal waveform input, more bits are allocated to a block containing the specific spectrum, for remarkably improving an overall signal-to-noise characteristic. In general, the human acoustic sense is quite sensitive to the signal having acute spectrum components. Hence, the improvement of the signal-to-noise characteristic through this method is effective in improving the measuring numeric values as well as the sound quality from a view of an acoustic sense.

As a bit allocation method, many other methods have been proposed. If those methods may make a model about an acoustic sense more sophisticated and enhance the performance of the coding device, the coding is more high-efficient from a view of an acoustic sense.

The inventors et.al. of the present application have proposed in the U.S. patent application Ser. No. 08/374,518 (filed in May 31, 1994) a method of separating a tone component that is quite important from a view of an acoustic sense from the spectrum signal and coding the separated component in another manner rather than the remaining spectrum component. This method makes it possible to efficiently code the signal such as an audio signal at a high compression rate without having to substantially degrade the acoustic sense.

By lengthening the time block used for the transform, in general, the spectrum frequency resolution is made higher and the energy is concentrated on the specific spectrum component. Hence, by overlapping a half of one block with a half of the adjacent block for making the block length for the transform longer and using the modified DCT transform that inhibits to increase the number of the spectrum signals as compared with the number of the original time samples, it is possible to perform more high-efficient coding than the use of the Discrete Fourier Transform (DFT) or the Discrete Cosine Transform (DCT). Further, by making the overlapped portion between the adjacent blocks far longer, it is possible to reduce the inter-block distortion of the waveform signal.

As mentioned above, by dividing the acoustic signal into frequency components before coding, it is possible to effectively use the property of the acoustic sense, which realizes the efficient coding. However, if the acoustic signal is decomposed into the frequency components through the filter, the necessary computation is too massive. To overcome this shortcoming, the band-divisional filter may be a polyphase quadrature filter (called PQF) that enables to efficiently lower the amount of computation.

Further, one bottleneck appearing in the case of using the spectrum transform is a large buffer area for the computation. To overcome this bottleneck, the signal is pre-divided into subbands through the filter and then the spectrum transform is subject to the signal thinned out according to the band width. The effective band dividing filter used for this method may be the PQF that enables to efficiently lower the amount of computation.

In order to lower the amount of computation of the PQF, in general, it is possible to employ the method of separating the sum of products into two stages, temporarily save the computed result at the first stage in a buffer memory, and compute the result at the second stage of summing products.

However, as the data accuracy, the internal register has a length of 32 bits secured therein if the accuracy of the operating unit for doing the sum of products is 16 bits, for example. It means that the buffer memory for saving the operated result has to secure a bit length of 32 bits. This disadvantageously increases the hardware in scale.

SUMMARY OF THE INVENTION

The present invention is made in consideration of the above mentioned disadvantages. It is an object of the present invention to code and decode a signal with a generally small amount of hardware by doing a filtering operation with an algorithm having a small amount of computation and realizing the filter with the method of keeping an operating accuracy only for the band requiring the operating accuracy.

The coding method and apparatus according to the present invention is characterized in that the accuracy of dividing the signal into subbands is higher in a specific subband rather than in the other subbands.

The decoding method and apparatus according to the present invention is characterized in that the accuracy of synthesizing the subbands is higher in a specific subband rather than in the other subbands.

The coding process containing a filter of dividing the signal into subbands and the decoding process containing a filter of synthesizing the subbands is executed to secure the necessary sound quality with a relatively small amount of computation by enhancing the operating accuracy only in specific subbands.

DESCRIPTION OF THE PREFERRED EMBODIMENTS

Figure 1:
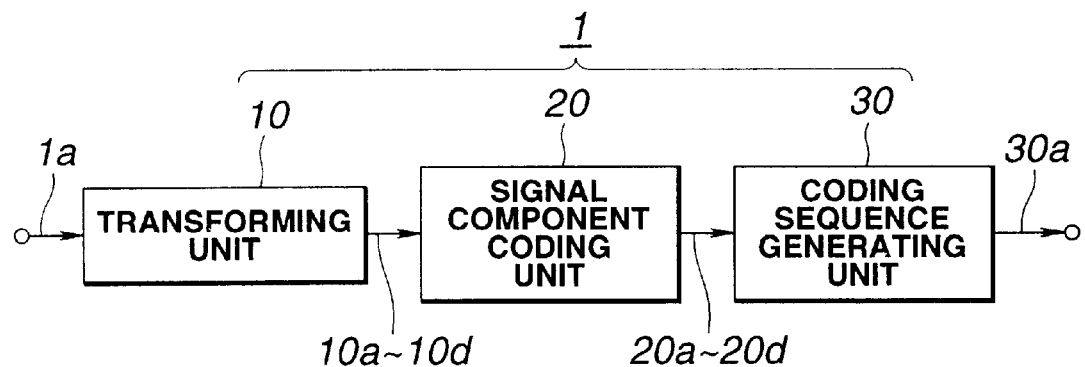
FIG. 1 is an overall block diagram showing a coder according to the present invention.

Later, the description will be oriented to the embodiments of the present invention with reference to the appended drawings. FIG. 1 is a block diagram showing an overall arrangement of a coding device for an acoustic waveform signal according to the present invention. The coding device 1 for the acoustic waveform signal includes a transform unit 10 for transforming an input signal waveform 1a into spectrum signal components 10a to 10d for the corresponding subbands, a signal component coding unit 20 for coding each of the spectrum signal components 10a to 10d for the corresponding subbands supplied from the transform unit 10, and a code sequence generating unit 30 for generating a code sequence 30a based on the quantizing outputs 20a to 20d of the subbands supplied from the signal component coding unit 20.

In the operation of the coding device 1 for the acoustic waveform signal, the transform unit 10 operates to transform the input signal waveform 1a into the spectrum signal components 10a to 10d for the corresponding subbands. Then, those spectrum signal components 10a to 10d are coded by the signal component coding unit 20. Next, the code sequence generating unit 30 operates to generate a code sequence 30a from the coded signal components.

Figure 2:
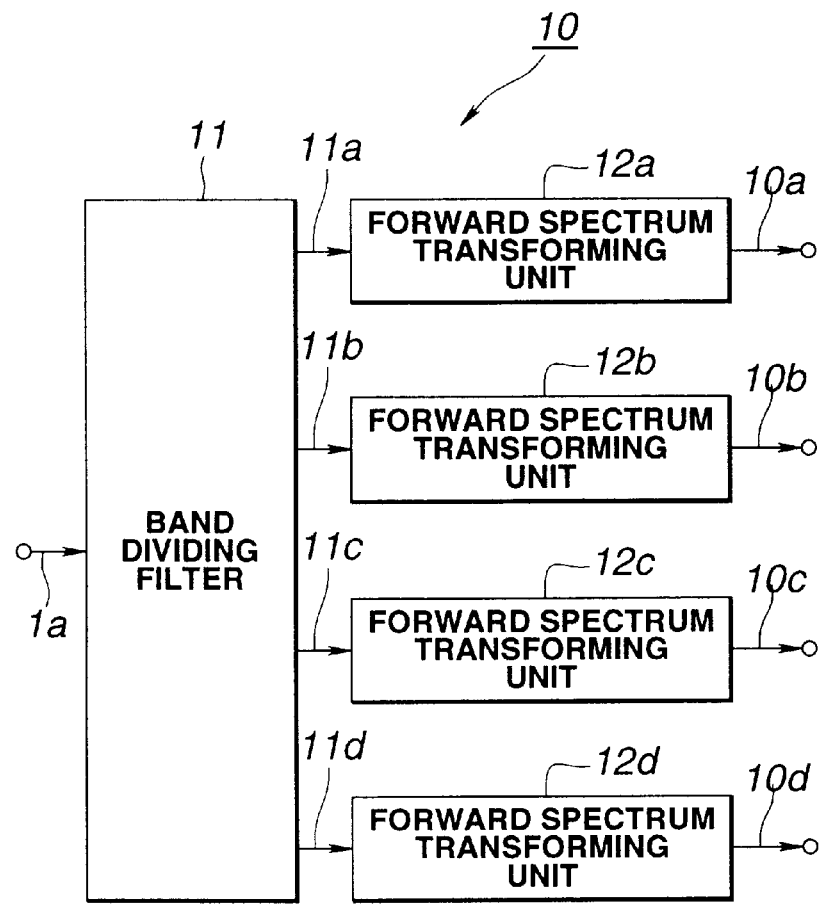
FIG. 2 is a block diagram showing a concrete arrangement of a transforming unit provided in the coder according to the present invention.

FIG. 2 is a block diagram showing a concrete arrangement of the transform unit. The transform unit 10 includes a band dividing filter 11 for dividing the input signal waveform 1a into four subbands and forward spectrum transform units 12a to 12d for transforming subband signals 11a to 11d for the corresponding subbands output from the band dividing filter 11 into spectrum signal components 10a to 10d.

The band width of each of the subband signals 11a to 11d output from the band dividing filter 11 is a quarter of the band width of the input signal waveform 1a. That is, the width is thinned out by a quarter rather than the band width of the input signal waveform 1a. The forward spectrum transform units 12a to 12d perform some processings such as a modified DCT transform (MDCT) with respect to the subband signals 11a to 11d for the corresponding subbands and then output the spectrum signal components 10a to 10d.

Figure 3:
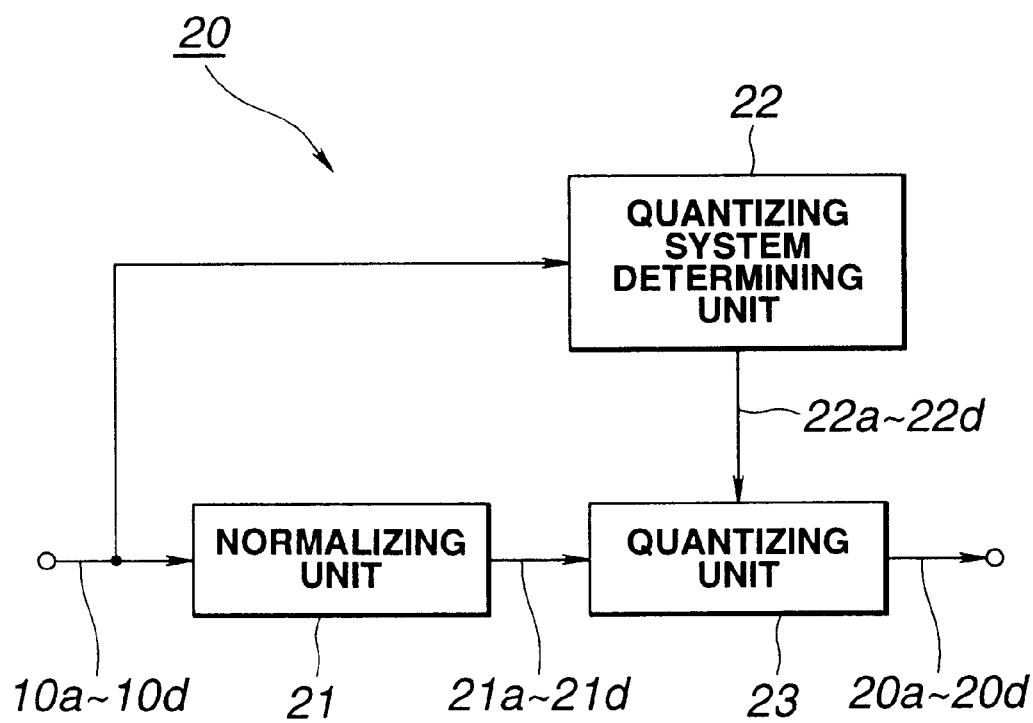
FIG. 3 is a block diagram showing a concrete arrangement of a unit for coding signal components provided in the coder according to the present invention.

FIG. 3 is a block diagram showing a concrete arrangement of the signal component coding unit. The coding unit 20 includes a normalizing unit 21 for normalizing the spectrum signal components 10a to 10d at the corresponding subbands, a quantizing accuracy determining unit 22 for operating and determining a quantizing accuracy based on the spectrum signal components 10a to 10d, and a quantizing unit 23 for quantizing the normalized spectrum signal components 21a to 21d output from the normalizing unit 21 based on the quantizing accuracies 21a to 22d output from the normalizing unit 21. The quantizing unit 23 operates to supply the quantizing outputs 20a to 20d for the corresponding subbands. Those quantizing outputs 20a to 20d contain the corresponding quantized signal components as well as information about normalizing coefficients and quantizing accuracies.

Figure 4:
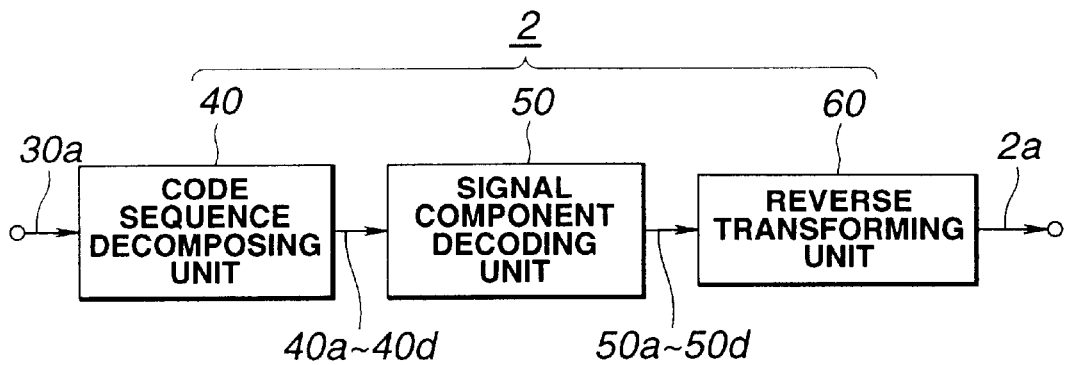
FIG. 4 is an overall block diagram showing a decoder according to the present invention.

FIG. 4 is a block diagram showing an overall arrangement of a decoding device for an acoustic waveform signal according to the present invention. This decoding unit 2 is operated to derive an acoustic signal 2a from the code sequence 30a generated by the coding device 1 shown in FIG. 1. The decoding device 2 includes a code sequence decomposing unit 40 for decomposing the code sequence 30a and extracting codes 40a to 40d for the corresponding subbands, a signal component decoding unit 50 for decoding the signal components for the corresponding subbands based on the codes 40a to 40d output from the code sequence decomposing unit 40, and a reverse transform unit 60 for performing a reverse transform process with respect to the signal components decoded signals 50a to 50d for the corresponding subbands output by the signal component decoding unit 50, synthesizing a reverse transformed output for each subband and producing the acoustic waveform signal 2a.

In the operation of this decoding device 2, the code sequence decomposing unit 50 operates to extract the codes 40a to 40d for the corresponding subbands from the code sequence 30a. Then, the signal component decoding unit 50 operates to decode the signal component decoded signals 50a to 50d for the corresponding subbands from those codes 40a to 40d. Next, the reverse transform unit 60 operates to produce the acoustic signal 2a.

Figure 5:
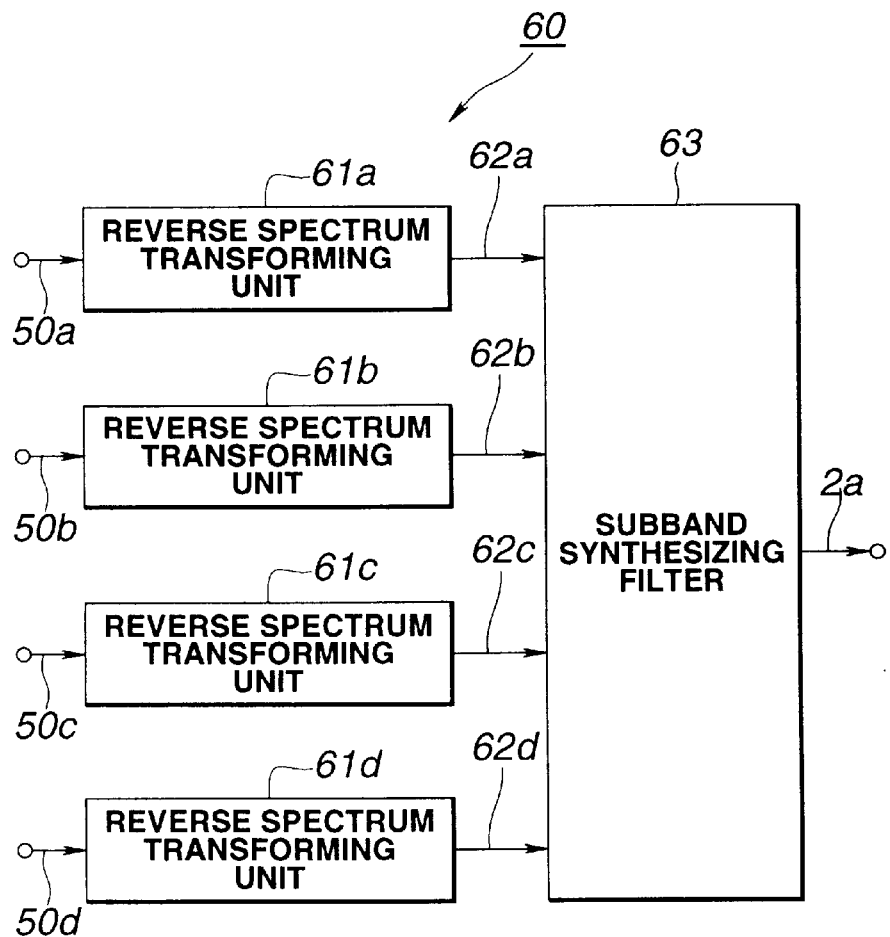
FIG. 5 is a block diagram showing a concrete arrangement of a reverse-transform unit provided in the decoder according to the present invention.

FIG. 5 is a block diagram showing a concrete arrangement of the reverse transform unit. The reverse transform unit 60 shown in FIG. 4 corresponds to the transform unit 10 shown in FIG. 2. The reverse transform unit 60 includes reverse spectrum transform sections 61a to 61d and a subband synthesizing filter 63. The reverse spectrum transform sections 61a to 61d operate to perform a reverse spectrum transform with respect to each of the signal component decoded signals 50a to 50d. The subband synthesizing filter 63 operates to synthesize signals 62a to 62d for the corresponding subbands output by the reverse spectrum transform sections 61a to 61d.

In the operation of the reverse transform unit 60, the reverse spectrum transform sections 61a to 61d perform the reverse spectrum transform with respect to the signal component decoded signals 50a to 50d for the corresponding subbands. Then, the subband synthesizing filter 63 operates to synthesize the signals 62a to 62d produced by the reverse spectrum transform for producing the acoustic signal 2a.

The band dividing filter 11 shown in FIG. 2 or the subband synthesizing filter 63 shown in FIG. 5 is composed of a filter bank called a polyphase quadrature filter (simply called PQF). As discussed in the foregoing writing: ICASSP 83, BOSTON Polyphase Quadrature filters-A new subband coding technique, Joseph H. Rothweiler, the PQF is a filter bank basically composed of a filter called a prototype filter and provides a function of dividing the overall band into subbands whose widths are equal to each other and synthesizing the signals of the subbands into a signal for the overall band.

Figure 6:
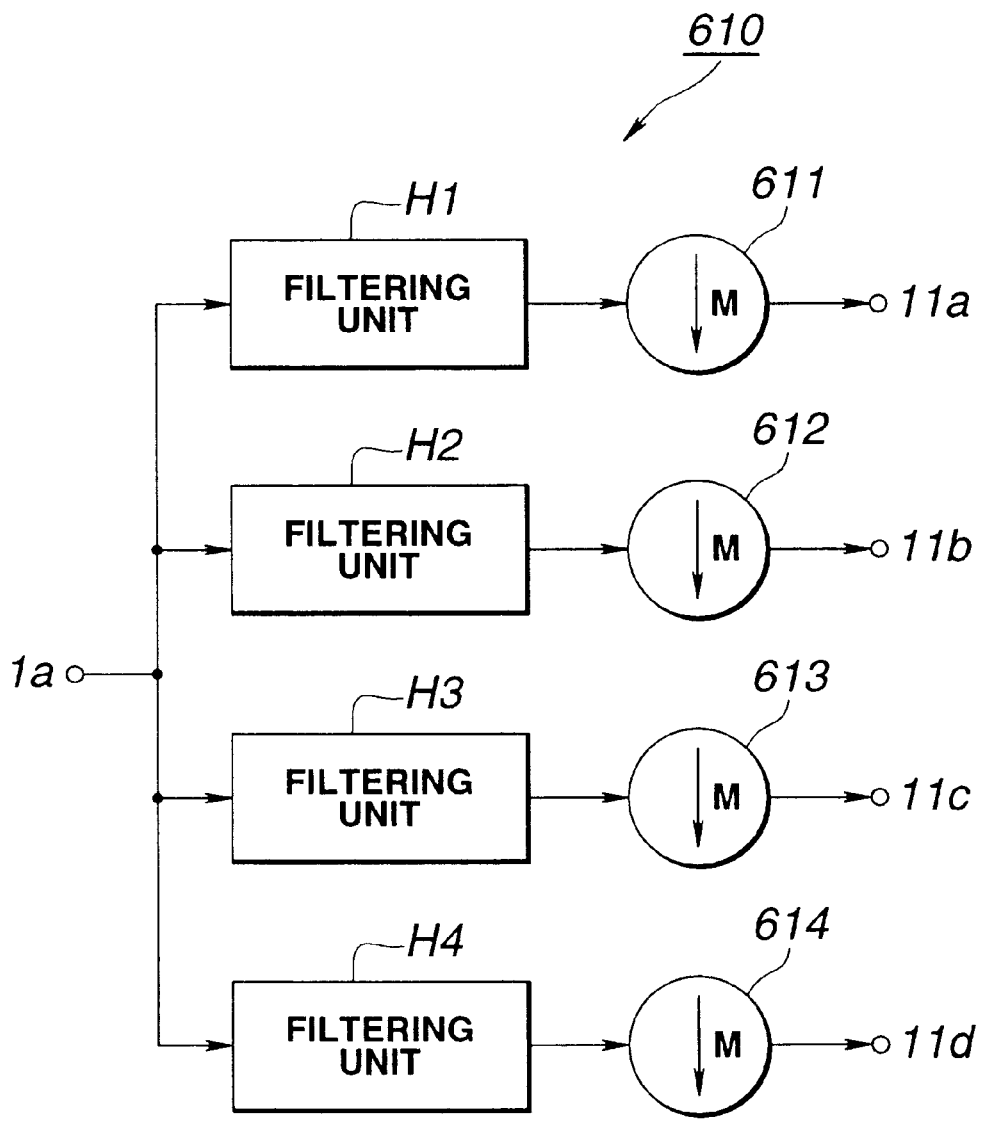
FIG. 6 is a block diagram showing a band dividing filter using a PQF according to the present invention.

FIG. 6 is a block diagram showing a band dividing filter composed of the PQF. This band dividing filter 610 is composed of filtering sections H1 to H4, each of which is a products summing unit, and thinning sections 611 to 614 provided for the filtering sections H1 to H4 respectively. The input signal waveform 1a is divided into four subbands whose widths are equal to each other through the effect of the filtering sections H1 to H4 each composed of the products summing unit. Then, these subbands are thinned out to 1/M by the thinning sections 611 to 614, respectively, where M is a divisional number of the band. In this embodiment, M is four, the synthesis of the subband signals 11a to 11d for the corresponding bands is made identical to a sample rate of the input signal waveform 1a.

Figure 7:
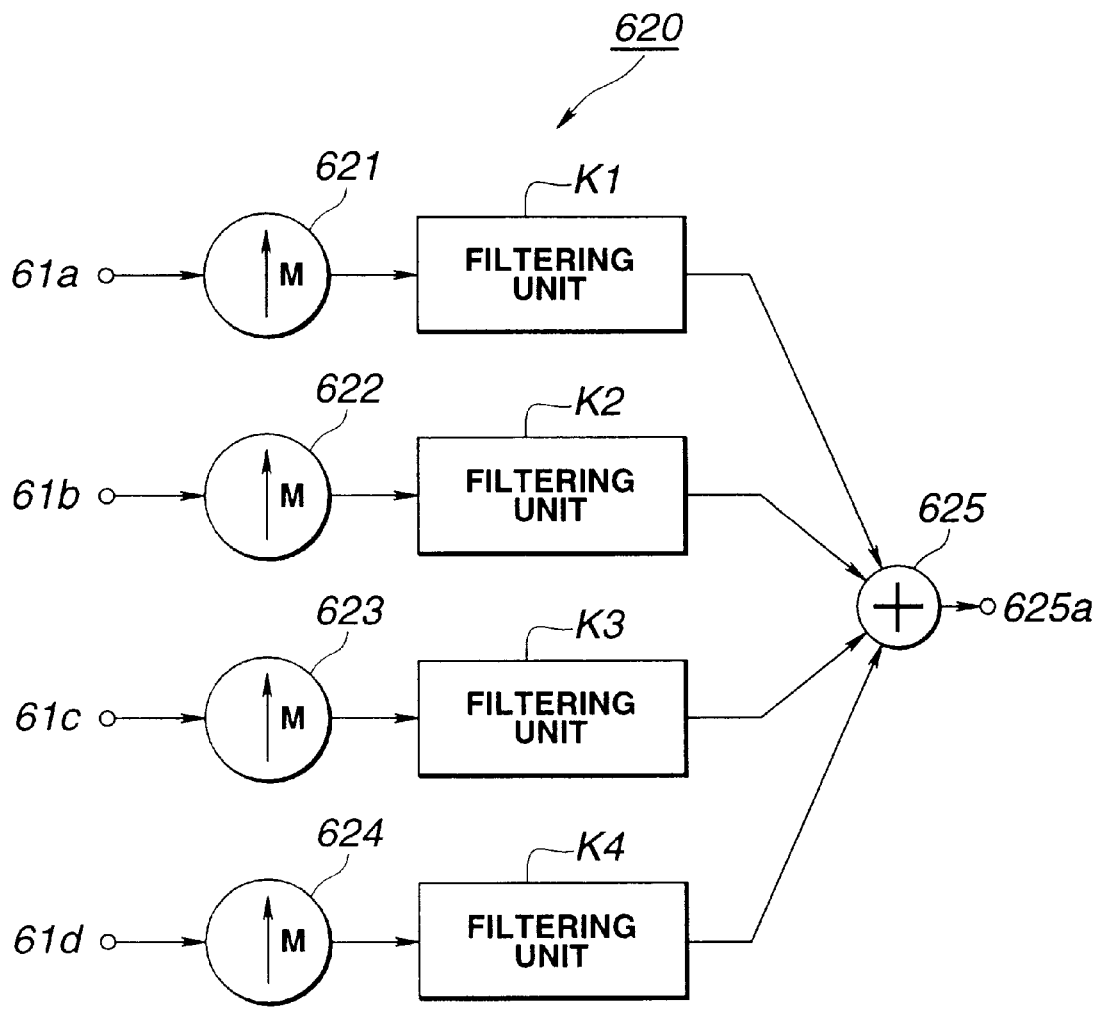
FIG. 7 is a block diagram showing a subband synthesizing filter using a PQF according to the present invention.

FIG. 7 is a block diagram showing an arrangement of a subband synthesizing filter using the PQF. This subband synthesizing filter 620 includes inserting units 621 to 624 for inserting a value of 0 in place of a sample thinned out at each subband, filtering units K1 to K4 provided for the inserting units 621 to 624, respectively, and an adding unit 625 for adding the outputs of the filtering units K1 to K4. In the operation of this subband synthesizing filter 620, the inserting units 621 to 624 operate to insert a value of 0 in place of the sample thinned out by the inserting units 621 to 624 to the signals 61a to 61d of these subbands. Then, the filtering units K1 to K4 perform a filtering process with respect to the outputs of the inserting units 621 to 624. Next, the adding unit 625 operates to add the sample values of the subbands to one signal.

Herein, the description will be oriented to an arrangement of filter coefficients used in the band dividing filter shown in FIG. 6 and a subband synthesizing filter shown in FIG. 7.

The PQF is arranged to give rise to the filter coefficients of the band dividing filter shown in FIG. 6 and the subband synthesizing filter shown in FIG. 7 through the prototype filter so that the aliasing component taking place in dividing the band is cancelled when the subbands are synthesized. The arrangement of the filter coefficients just needs to meet the sufficient condition given by the expressions (10), (13) and (14) indicated in the 1282 page of the foregoing writing of ICASSP 83, Boston Polyphase Quadrature filters-A new subband coding technique, Joseph H. Rothweilerh. Hence, the arrangement is not unique.

As an example, the coefficients of the PQF for dividing the band and synthesizing the subbands may be defined as the following expressions (1) and (2) from the coefficient h(n) of the prototype filter.

$$h_i(n) = 2\cos\left(\frac{(2i+1)(2n+1+M)\pi}{4M}\right)h(n) \quad (1)$$

$$(0 \le n \le 2MK - 1, 0 \le i \le M - 1)$$

$$k_i(n) = 2\cos\left(\frac{(2i+1)(2n+1-M)\pi}{4M}\right)h(n) \quad (2)$$

$$(0 \le n \le 2MK - 1, 0 \le i \le M - 1)$$

where M is a number of subbands, K is a number defined by K=N/2M in which N is a number of filter coefficients, h(n) is a coefficient of the prototype filter, hi(n) is a coefficient of an i-th subband of the band dividing filter, and ki(n) is a coefficient of an i-th subband of the band synthesizing filter.

Figure 8:
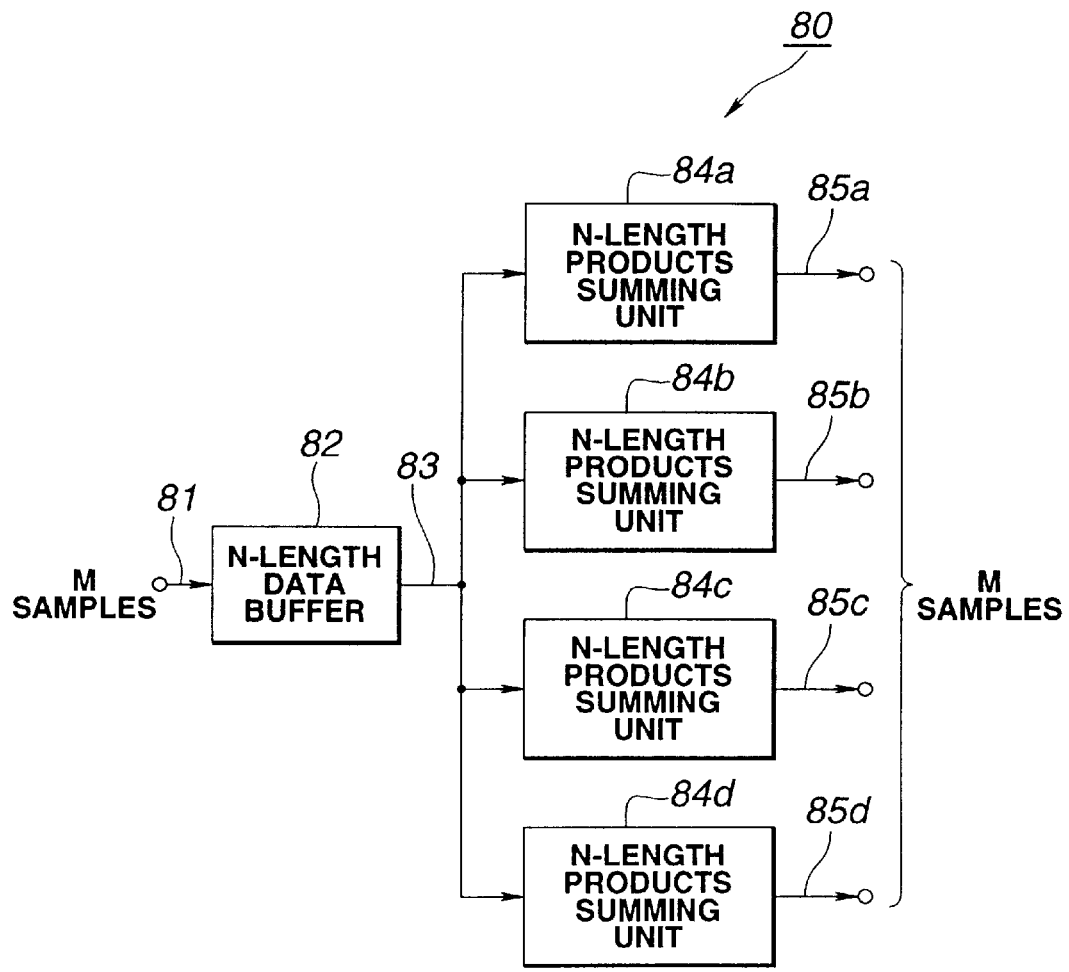
FIG. 8 is a block diagram showing the conventional unit for doing a band dividing filtering operation.

FIG. 8 is a block diagram showing an arrangement of an operating unit of the conventional band dividing filter. The conventional band dividing filtering unit 80 performs the calculation of the expression (1). This operating unit 80 includes an N-length data buffer 82 with a length of N to which an input sample (M sample) 81 is supplied and N-length products summing units 84a to 84d to which the data 83 of the N-length data buffer 82 is supplied. The number of these products summing units is equal to the subband number M. Numbers 85a to 85d denote operated outputs of the N-length products summing units 84a to 84d.

The input sample 81 is applied to the N-length data buffer 82 in which the previous unnecessary data is sequentially discarded. M number of N-length products summing units 84a to 84d use the data 83 of the N-length data buffer 82 and perform the sum of products with respect to the length N of the corresponding subband based on the expression (1). As shown in FIG. 6, after the sum of products, the sample is thinned out to 1/M. Hence, when M new samples are input, each sum of products is done one by one. It means that the conventional band dividing filtering unit 80 shown in FIG. 8 performs the N-length sum of products with respect to one input sample at one time.

Figure 9:
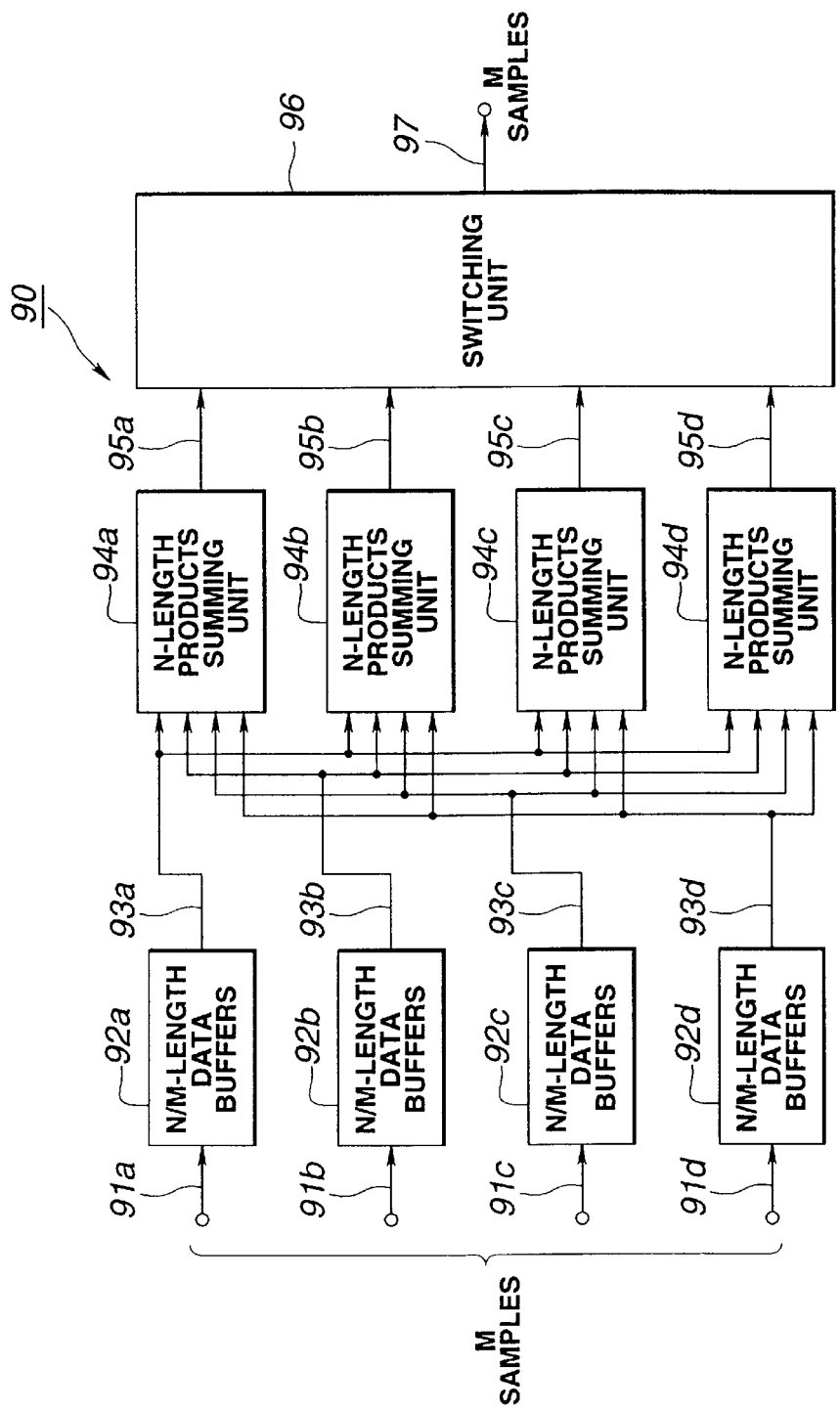
FIG. 9 is a block diagram showing the conventional unit for doing a subband synthesizing filtering operation.

FIG. 9 is a block diagram showing an arrangement of the conventional subband synthesizing filtering unit. This operating unit 90 performs the calculation indicated by the expression (2). This operating unit 90 includes N/M-length data buffers 92a to 92d to which samples 91a to 91d are supplied, N-length products summing units 94a to 94d to which the data 93a to 93d of the N/M-length data buffers 92a to 92d are supplied, and a switching unit 96 for switching the operated outputs 95a to 95d of the N-length products summing units 94a to 94d. A numeral 97 denotes an output of the switching unit 96.

The subband synthesizing filter, as shown in FIG. 7, performs the N-length sum of products after 0 data is inserted and then adds them to one output. In actual it, an operation should not be performed in the portion of 0 data. Hence, the length of the sum of products at each subband is just N/M. After all, about all the subbands, only the N-length sum of products should be done for one output sample. By repeating this process M times as shifting the filter coefficients one by one, the subband synthesizing filter enables to output M samples. The N-length products summing units 94a to 94d, the prepared number of which is equal to the subband number M, perform the calculations with respect to the corresponding samples. Hence, the prior art shown in FIG. 9 performs the N-length sum of products at one time.

For the PQF, however, in actual, it is known that a smaller amount of operation realizes the division of the band and the synthesis of the subbands. Next, the description will be oriented to the improved conventional operating method. At first, the method will be described where the band dividing filter indicated by the expression (1) is efficiently calculated at each N-length block as shifting the block M by M as indicated in the following expression (3).

$$V_i(J) = \sum_{l=0}^{2MK-1} p_i(l)\hat{h}(l)\hat{x}_J(l) \quad (0 \le i \le M - 1) \quad (3)$$

where Vi(J) is a sample thinned out at the i-th band of the J-th block after the band division and X^J(1), h^(1) and pi(1) are given by the following expressions (4), (5) and (6).

$$\hat{x}_J(l) = x(JM + l) \quad (4)$$

$$\hat{h}(l) = h(2MK - 1 - l) \quad (5)$$

$$p_i(l) = 2\cos\left(\frac{(2i+1)(2(2MK-1-l)+1+M)\pi}{4M}\right) \quad (6)$$

$$= 2(-1)^K \cos\left(\frac{(2i+1)(2M-1-2l)\pi}{4M}\right)$$

As is obvious from the expressions, pi(1) keeps the symmetry as indicated in the expressions (7), (8) and (9).

$$Pi(2M + l) = -Pi(l) \quad (7)$$

$$p_i\left(\frac{M}{2} - 1 - l\right) = p_i\left(\frac{M}{2} + l\right) \quad (8)$$

$$p_i\left(\frac{3M}{2} - 1 - l\right) = -p_i\left(\frac{3M}{2} + l\right) \quad (9)$$

With the expression (7), the expression (3) is transformed into the expression (10).

$$V_i(J) = \sum_{k=0}^{K-1}\sum_{l=0}^{2M-1} (-1)^k p_i(l)\hat{h}(2Mk+l)\hat{X}_J(2Mk+l) \quad (10)$$

$$= \sum_{l=0}^{2M-1} p_i(l)\sum_{k=0}^{K-1} (-1)^k \hat{h}(2Mk+l)\hat{X}_J(2Mk+l)$$

-continued $$= \sum_{l=0}^{2M-1} p_i(l)A(l) \quad (0 \le i \le M-1)$$

where A(1) is defined by the expression (11).

$$A(l) = \sum_{k=0}^{k-1} (-1)^k \hat{h}(2Mk+1)\hat{x}_J(2Mk+l) \quad (11)$$

$$(0 \le 1 \le 2M-1)$$

Herein, the substitution of the expressions (8) and (9) makes it possible to yield the expression (12).

$$v_i(J) = \sum_{l=0}^{\frac{M}{2}-1} p_i(l)(A(l) + A(M-1-l)) + \qquad (12)$$

$$\sum_{l=0}^{\frac{M}{2}-1} p_i(l+M)(A(l+M) - A(2M-1-l))$$

$$= \sum_{l=0}^{\frac{M}{2}-1} p_i(l)(A(l) + A(M-1-l)) +$$

$$\sum_{l=\frac{M}{2}}^{M-1} p_i\left(l+\frac{M}{2}\right)\left(A\left(l+\frac{M}{2}\right) - A\left(\frac{5M}{2}-1-l\right)\right)$$

$$= \sum_{l=0}^{M-1} s_i(l)B(l) \quad (0 \le i \le M-1)$$

where B(1) denotes a value given on the way of the operation indicated by the expression (13) and si(1) denotes a coefficient given by the expression (14). Hence, at first, according to the expression (13), by executing the 2k-length sum of M products, M B(1) are derived. Next, according to the expression (12), by executing the M-length sum of M products, M Vi(J) are derived. As a result, M output samples can be derived from M input samples.

$$B(l) = \begin{cases} A(l) + A(M-1-l) & \left(0 \le l \le \frac{M}{2}-1\right) \\ A\left(l+\frac{M}{2}\right) - A\left(\frac{5M}{2}-1-l\right) & \left(\frac{M}{2} \le l \le M-1\right) \end{cases} \quad (13)$$

$$s_i(l) = \begin{cases} Pi(l) & \left(0 \le l \le \frac{M}{2}-1\right) \\ Pi\left(l+\frac{M}{2}\right) & \left(\frac{M}{2} \le l \le M-1\right) \end{cases} \quad (14)$$

Figure 10:
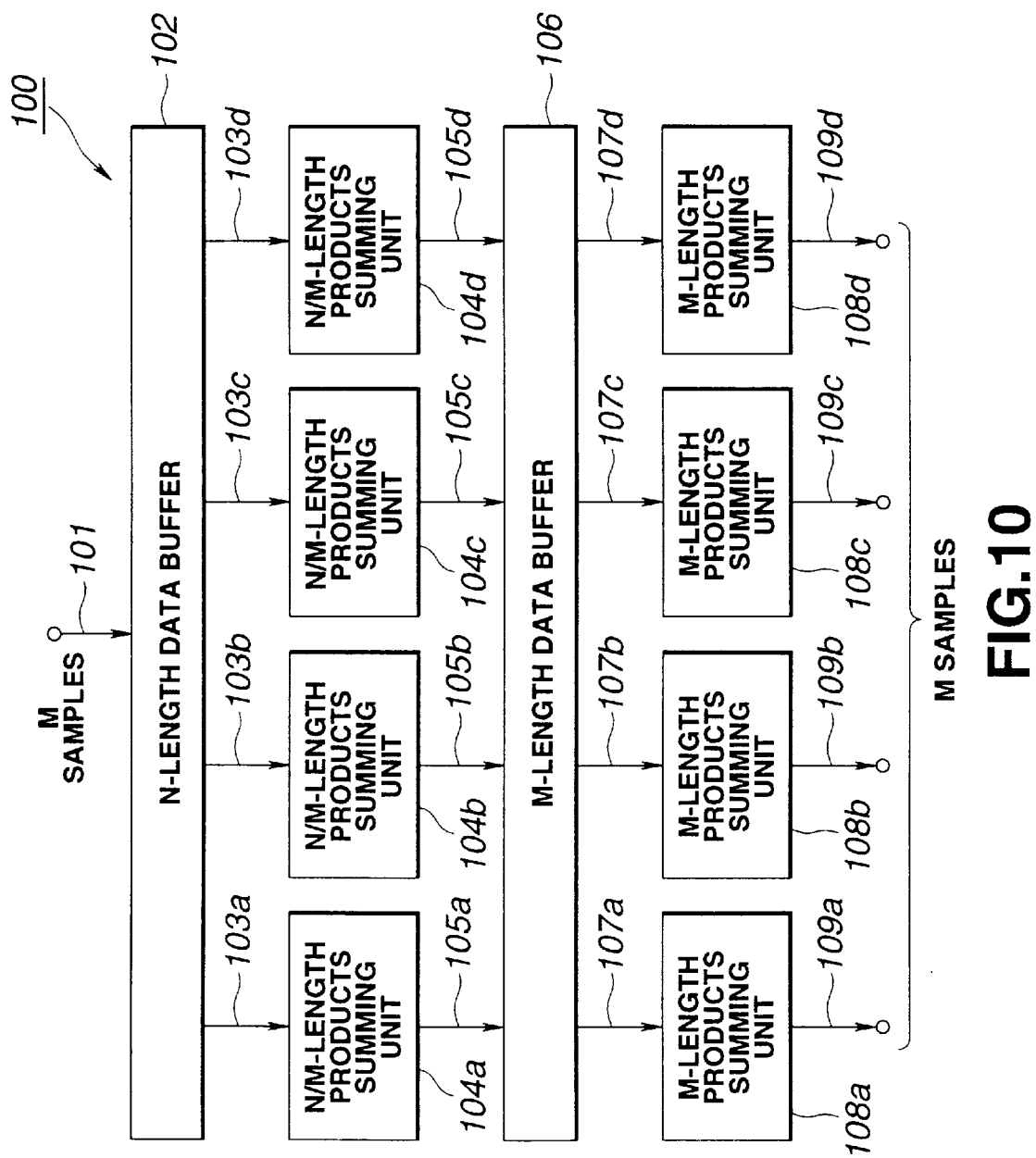
FIG. 10 is a block diagram showing the improved conventional unit for doing a band dividing filtering operation.

FIG. 10 is a block diagram showing an arrangement of the improved conventional band dividing filtering unit. The improved conventional band dividing coefficient operating unit 100 includes an N-length data buffer 102 for storing an input sample 101, N/M-length products summing units 104a to 104d to which the data 103a to 103d of the N-length data buffer 102 are supplied respectively, an M-length data buffer 106 for storing the operated results 105a to 105d of the N/M-length products summing units 104a to 104d, and M-length products summing units 108a to 108d to which the data 108a to 107d of the M-length data buffer 106 are supplied respectively. Numerals 109a to 109d are the operated results of the M-length products summing units 108a to 108d.

The input sample 101 is stored in the N-length data buffer 102 in advance. Next, each of the N/M-length products summing units 104a to 104d performs the sum of products with a length of 2K=N/M indicated in the expressions (11) and (13) corresponding to any one of i=0 to i=M−1. The operated results 105a to 105d are stored in the M-length data buffer 106. Next, the M-length products summing units 108a to 108d perform the sum of products with a length of M indicated in the expression (12) corresponding to any one of i=0 to i=M−1. In this case, for one input sample, the sum of (2K+M) products are divided into two stages. For example, for M=4 and N=128, K=16 is derived. Hence, the operating unit (operating method) shown in FIG. 8 needs the sum of 128 products, while the calculating unit (calculating method) shown in FIG. 10 needs the sum of 36 products. It means that this calculating unit enables to greatly reduce the amount of the operation.

Next, the description will be oriented to the method for efficiently calculating the subband synthesizing filter given by the expression (2) at each N-length block as shifting the blocks M by M as indicated by the expression (15).

$$u((J-1)M+n+1) = \qquad (15)$$

$$\sum_{i=0}^{M-1} \sum_{l=0}^{2K-1} h(lM+n)qi(lM+n)vi(J+2K-1-l)$$

$$(0 \le n \le M-1)$$

where u((j−1) M=n=1) denotes M output samples of the J-th block and vi (J=2K−1−1) denotes a thinned sample of the i-th band. h(1M+n) is a coefficient of the prototype filter. qi (1M+n) is represented by the expression (16).

$$qi(l) = 2\cos\left(\frac{(2i+1)(2l+1-M)\pi}{4M}\right) \qquad (16)$$

$$(0 \le i \le M-1, 0 \le l \le 2K-1)$$

As is obvious from the expressions, qi(1) keeps the symmetry as indicated in the expressions (17), (18) and (19).

$$qi(2M+l) = -qi(l) \qquad (17)$$

$$qi\left(\frac{M}{2}-1-l\right) = qi\left(\frac{M}{2}+l\right) \qquad (18)$$

$$qi\left(\frac{3M}{2}-1-l\right) = -qi\left(\frac{3M}{2}+l\right) \qquad (19)$$

As indicated by the expression (20), it is understood that M number of u((J−1) M+n+1) are respectively obtained by the sum of products with a length of 2K=N/M.

$$u((J-1)M+n+1) = \qquad (20)$$

$$\sum_{k=0}^{K-1} \sum_{i=0}^{M-1} h(2kM+n)(-1)^k qi(n)vi(J+2K-1-2k) +$$

$$\sum_{k=0}^{K-1} \sum_{i=0}^{M-1} h((2k+1)M+n)(-1)^k qi(M+n) \times$$

$$vi(J+2K-1-(2k+1))$$

-continued $$= \sum_{k=0}^{K-1} h(2kM+N)(-1)^k \sum_{i=0}^{M-1} qi(n)vi(J+2K-1-2k) +$$

$$\sum_{k=0}^{K-1} h((2k+1)M+n)(-1)k \sum_{i=0}^{M-1} qi(M+n) \times$$

$$vi(J+2K-2-2k)$$

$$= \sum_{k=0}^{K-1} t0, n(k)C0, n(J+2K-1-2k) +$$

$$\sum_{k=0}^{K-1} t1, n(k)C1, n(J+2K-2-2k)$$

$$(0 \le n \le M-1)$$

where t0, n(j), t1 and n(j) are coefficients indicated by the expressions (21) and (22) and C0, n(j), C1, n(j) denote values derived on the operating way indicated by the expressions (23) and (24).

$$t_{0,n}(j) = h(2jM+n)(-1)^j \quad (0 \le n \le M-1) \quad (21)$$

$$t_{1,n}(j) = h((2j+1)M+n)(-1)^j \quad (22)$$

$$C_{0,n}(j) = \sum_{i=0}^{M-1} qi(n)vi(j) \quad (0 \le n \le M-1) \quad (23)$$

$$C_{1,n}(j) = \sum_{i=0}^{M-1} qi(M+n)vi(j) \quad (0 \le n \le M-1) \quad (24)$$

where totally 2M number of C0, n(j) and C1, n(j) are respectively obtained by the sum of products with a length of M as indicated by the expression (24). Totally, 2M number of values are obtained. As will be easily understood, the relation as indicated in the expressions (25) and (26) reduces the actually derived number of values to only M.

$$C_{0,n}(j) = C_{0,M-1-n}(j) \quad \left(0 \le n \le \frac{M}{2} - 1\right) \quad (25)$$

$$C_{1,n}(j) = -C_{1,M-1-n}(j) \quad \left(0 \le n \le \frac{M}{2} - 1\right) \quad (26)$$

Hence, at first, according to the expressions (23) and (24), by executing the sum of M products with a length of M M times, M number of C0, n(j) and C1, n(j) are obtained. Next, according to the expression (20), by executing the sum of M products with a length of 2K, M number of u((J−1) M+n+1) are obtained. As a result, M output samples can be obtained from M input samples.

Figure 11:
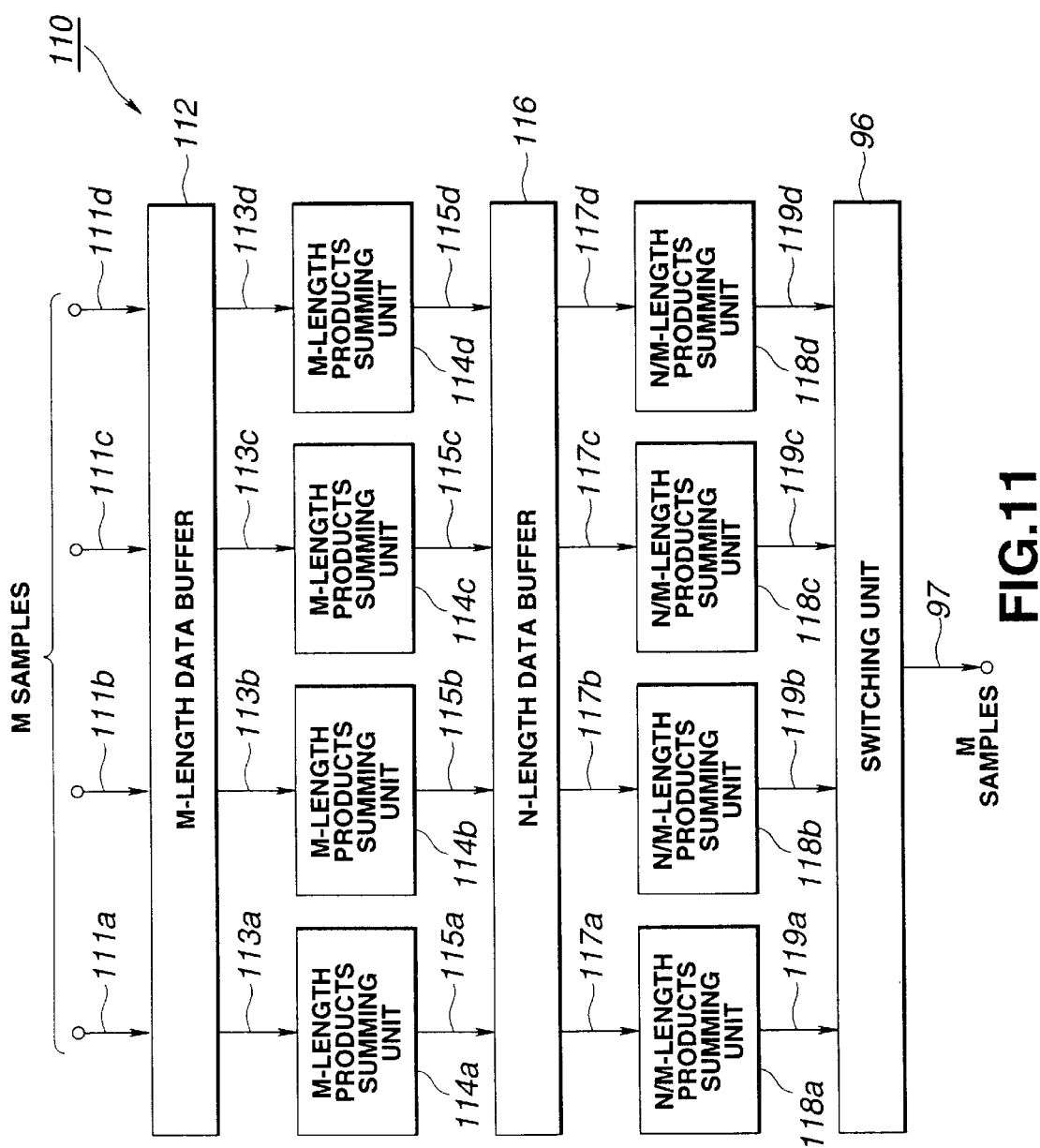
FIG. 11 is a block diagram showing the improved conventional unit for doing a subband synthesizing filtering operation.

FIG. 11 is a block diagram showing the improved conventional subband synthesizing filtering unit. The improved conventional subband synthesizing filtering unit 110 includes a M-length data buffer 112 for storing input samples 111a to 111d, M-length products summing units 114a to 114d to which the data 113a to 113d of the M-length data buffer 112 are supplied respectively, an N-length data buffer 116 for storing the operated results 115a to 115d of the M-length products summing units 114a to 114d, N/M-length products summing units 118a to 118d to which the data 117a to 117d of the N-length data buffer 116 are supplied respectively, and a switching unit 96 for switching the operated results 119a to 119d of the N/M-length products summing units 118a to 118d. A numeral 97 denotes an output of the switching unit 96.

The input samples 111a to 111d are stored in the M-length data buffer 112 in advance. Next, the M-length products summing units 114a to 114d perform the operations for deriving the totally M number of C0, n(j) and C1, n(J). The operated results 115a to 115d are stored in the N-length data buffer 116. Next, the N/M-length products summing units 118a to 118d perform the sum of products with a length of N/M indicated by the expression (20) corresponding to any one of n=0 to n=M−1. In this case, for one input sample, the sum of (2K+M) products is divided into two stages. For example, for M=4 and N=128, the method shown in FIG. 9 needs a sum of 128 products for one sample, while the method shown in FIG. 11 needs only a sum of 36 products. It means that the latter may greatly reduce the amount of the necessary operation.

Each of the foregoing operations may be executed by the leased means to the operation as well as time-divisionally executed by the operating unit under the control of the control unit. Next, the arrangement of the hardware of the latter case will be described with reference to FIG. 12.

Figure 12:
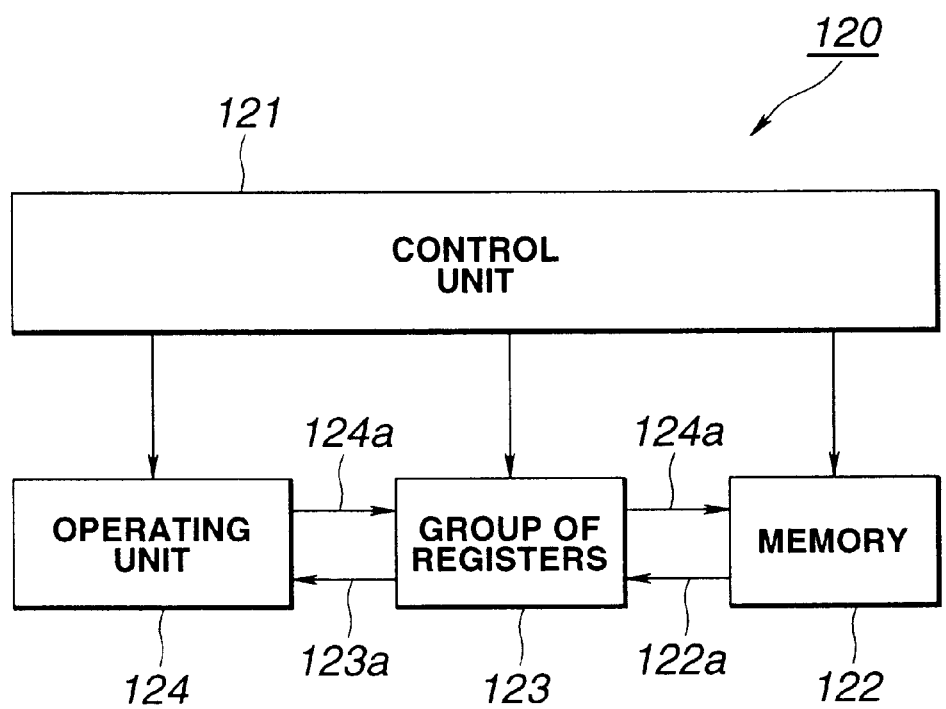
FIG. 12 is a block diagram showing a unit for doing a filtering operation according to the present invention.

FIG. 12 is a block diagram showing an arrangement of a filtering unit according to the present invention. The filtering unit 120 includes a control unit 121, a memory 122, a group of registers 123 and an operating unit, the latter three of which are operated under the control of the control unit 121.

Under the control of the control unit 121, the data 122a stored in the memory 122 is transferred to the group of registers 123. The operating unit 124 performs an operation such as a sum of products with respect to the data stored in the group of registers 123. The operated result 124a is stored in a register contained in the group of registers 123. The result 124a is saved in a given area of the memory 122 under the control of the control unit 121. In general, the group of registers 123 may often have a longer word length than the memory, because it is necessary to secure the accuracy on the operating way and suppress the overall hardware in scale.

Figure 19:
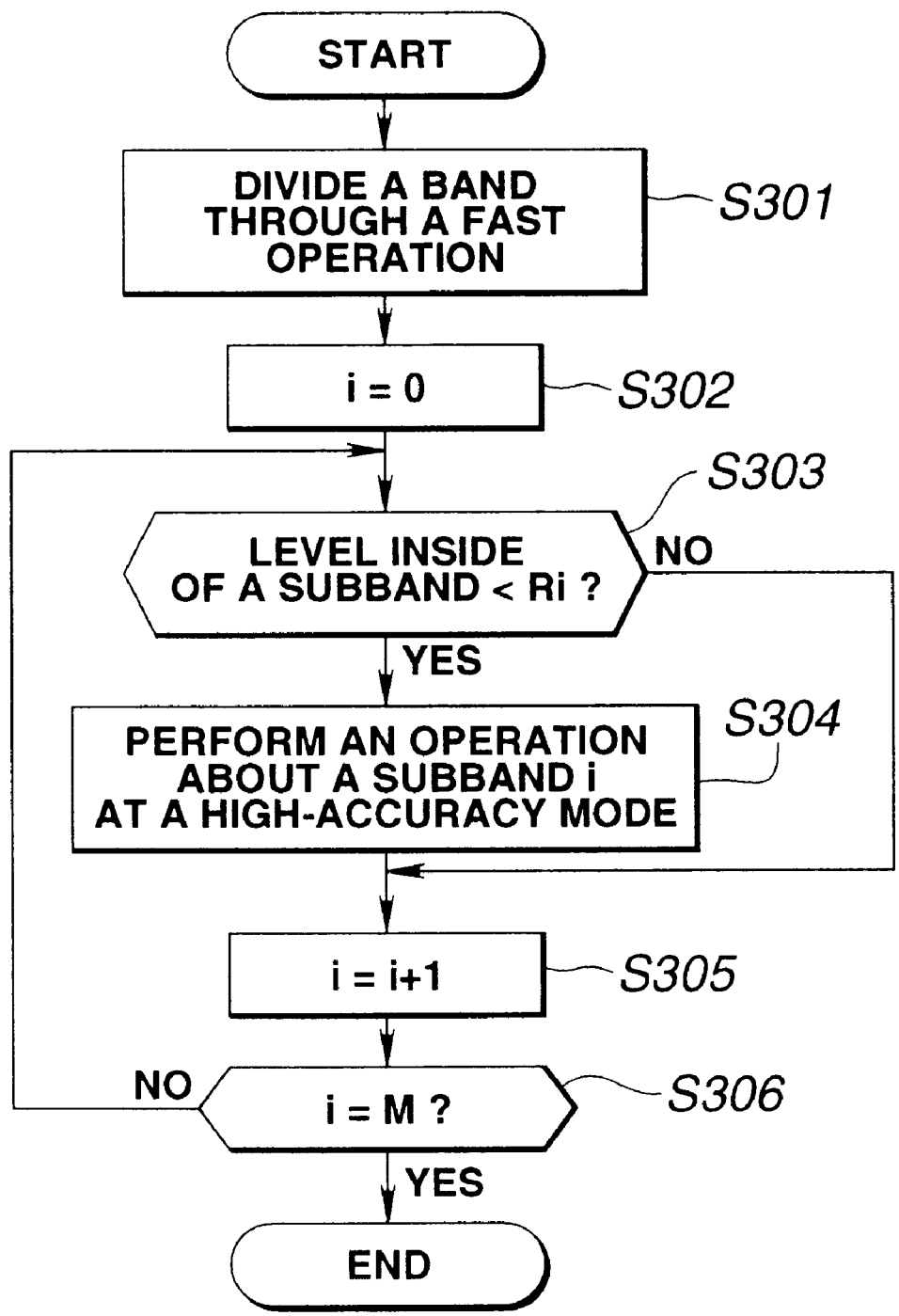
FIG. 19 is a flowchart showing a process of the band dividing filter shown in FIG. 17 realized by the unit for doing a filtering operation according to the present invention.

As mentioned above, the conventional band dividing filtering unit (in actual, the algorithm provided therein) as shown in FIGS. 8 and 19 as well as the conventional subband synthesizing filtering unit (in actual, the algorithm provided therein) as shown in FIGS. 9 and 11 are realized by the filtering unit shown in FIG. 12.

Figure 13:
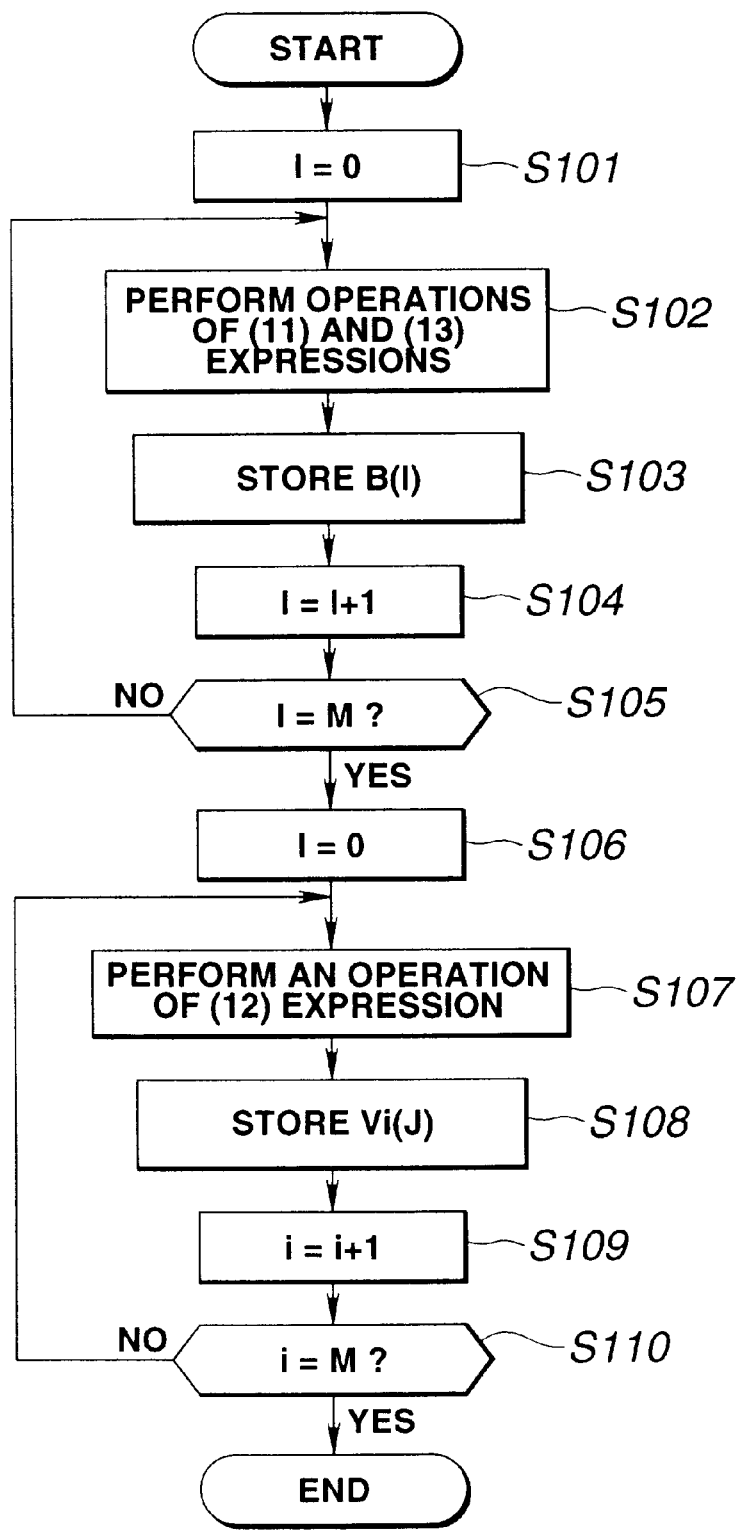
FIG. 13 is a flowchart showing a process of the unit for doing a band dividing filtering operation shown in FIG. 10 realized by the unit for doing a filtering operation according to the present invention.

FIG. 13 is a flowchart showing a process of the improved conventional band dividing coefficient operating unit shown in FIG. 10 realized by the filtering unit. At steps S101 to S105, the operation at the first stage is executed. Then, at steps S106 to S110, the operation at the second stage is executed. At the step S102, the operations of the expressions (11) and (13) are executed by the operating unit 124. At the step S103, the operated result is stored in the memory 122. At the step S107, the operation of the expression (12) is executed by the operating unit 124. At the step S108, the operated result (the final band-divided result) is stored in the memory 122.

Figure 14:
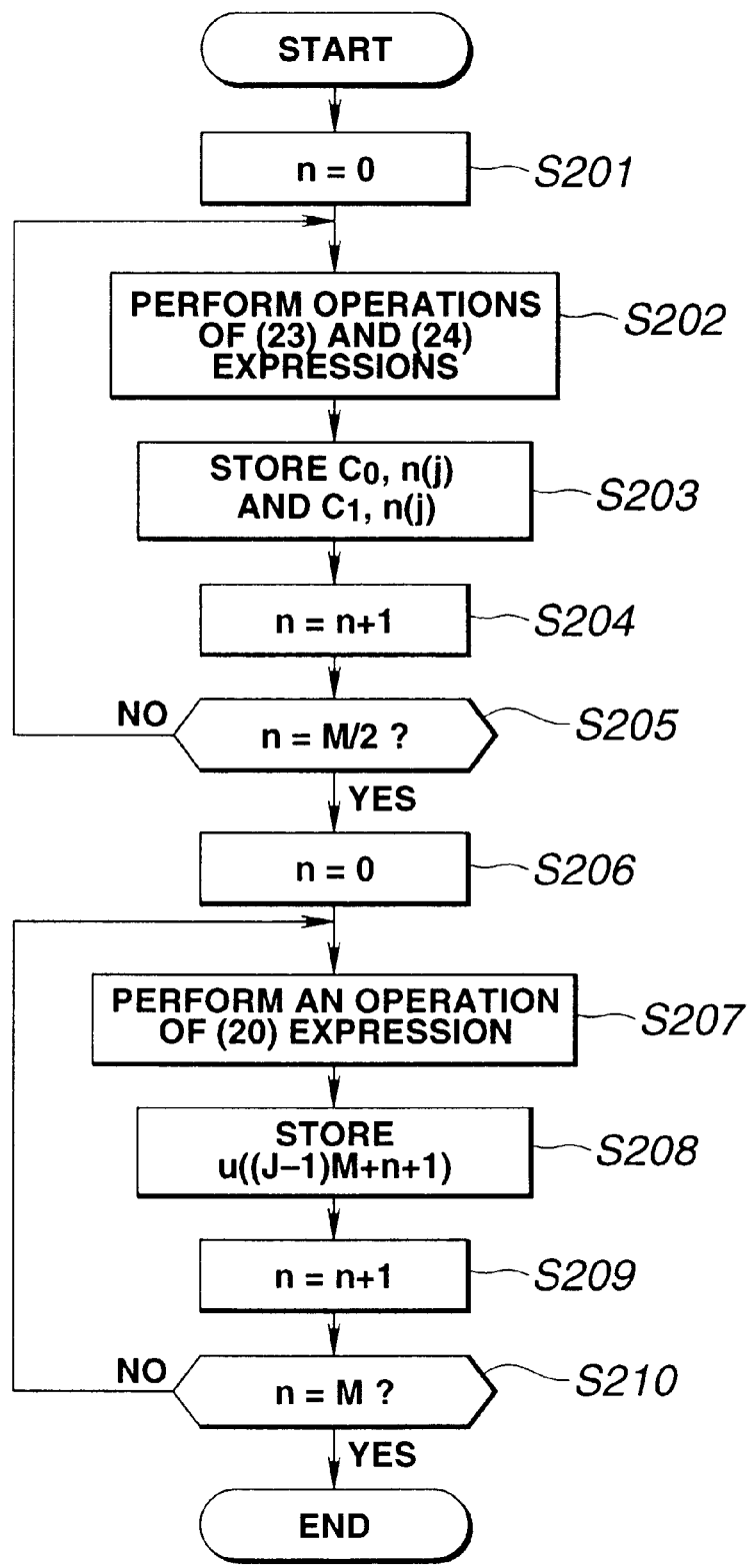
FIG. 14 is a flowchart showing a process of the unit for doing a subband synthesizing filtering operation shown in FIG. 11 realized by the unit for doing a filtering operation according to the present invention.

FIG. 14 is a flowchart showing a process of the improved conventional subband synthesizing coefficient operating unit shown in FIG. 11 realized by the filtering unit. At steps S201 to S205, the operation at the first stage is executed. Then, at steps S206 to 210, the operation at the second stage is executed. At the step S202, the operations of the expressions (23) and (24) are executed by the operating unit 124. At the step S203, the operated result is stored in the memory 122. At the step S207, the operation of the expression (20) is executed by the operating unit 124. Then, at a step S208, the operated result (the final subband synthesized result) is stored in the memory 122.

In these methods shown in FIGS. 13 and 14, however, at the step S103 or S203, the result on the operating way is stored in the memory 122. The accuracy of the result on the operating way is restricted by the word length of the memory 122. The lower operating accuracy brings about a noise and has a great adverse effect on the sound quality in the band where the noise appears. For example, in the case that the sound in the band that is equal to or lower than 24 kHz is sampled at 48 kHz, the band is divided into four subbands through the effect of the PQF, and the sound at each subband is transformed into the spectrum through the effect of the MDCT, if the group of registers each have a 32-bit word length and each memory has a 16-bit word length, even in the lowest subband down to 6 kHz to which the acoustic sense is quite sensitive, the restriction of the word length of the memory brings about the noise. However, the noise appearing in this subband has a great bad impact on the sound quality from a view of an acoustic sense.

In consideration of these shortcomings, the method of this invention is executed to do a filtering operation so that the operating accuracy may be secured in the subband where the high accuracy is required even if the amount of the operation is massive. In the other subband, the filtering operation is executed so that the amount of the operation is reduced. Even relatively smaller hardware amount makes it possible to secure sufficiently excellent sound quality.

Figure 15:
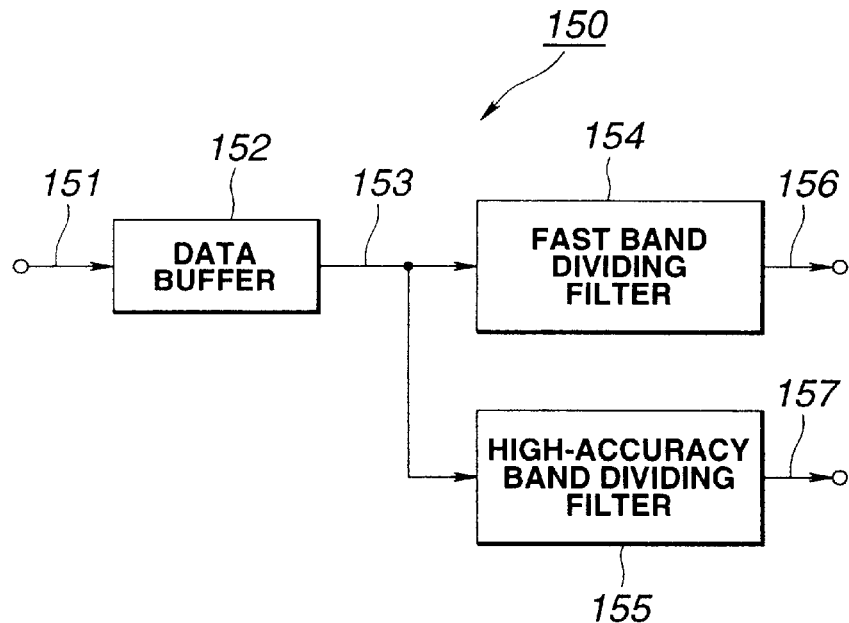
FIG. 15 is a block diagram showing a band dividing filter according to the present invention.

FIG. 15 is a block diagram showing a band dividing filter according to the present invention. The band dividing filter 150 shown in FIG. 15 includes a data buffer 152 for temporarily storing an input sample 151 and fast band dividing filtering unit 154 and high-accuracy band dividing filtering unit 155 to which the data 153 of the data buffer 152 is supplied. A numeral 156 denotes an output of the fast band dividing filtering unit 154. A numeral 157 denotes an output of the high-accuracy band dividing filtering unit 155.

The high-accuracy band dividing filtering unit 155 performs the same process as the N-length products summing unit 84a in the lowest band area that is important to the acoustic sense. This process is a simple sum of products. As described above, the result on the operating way is not required to be stored in the data buffer 152. Hence, even relatively smaller hardware makes it possible to secure sufficiently high operating accuracy.

The fast band dividing filtering unit 154 performs the same process as the arrangement shown in FIG. 10 except the M-length products summing unit 84a for supplying samples of the other subbands.

In this band dividing filter 150, for processing M input samples 151, the fast band dividing filtering unit 154 is required to sum ((2K+M) M−M) products and the high-accuracy band dividing filtering unit 155 is required to sum 2KM products. By summing (((2K+M) M−M)+2KM)/M=(4K+M) M−M) products for one sample, it is possible to divide the accuracy required for each subband. For example, in the case of M=4 and N=128, K=16 is given. The method shown in FIG. 8 needs to sum 128 products for one sample, while the method shown in FIG. 15 needs to sum 67 products.

Figure 16:
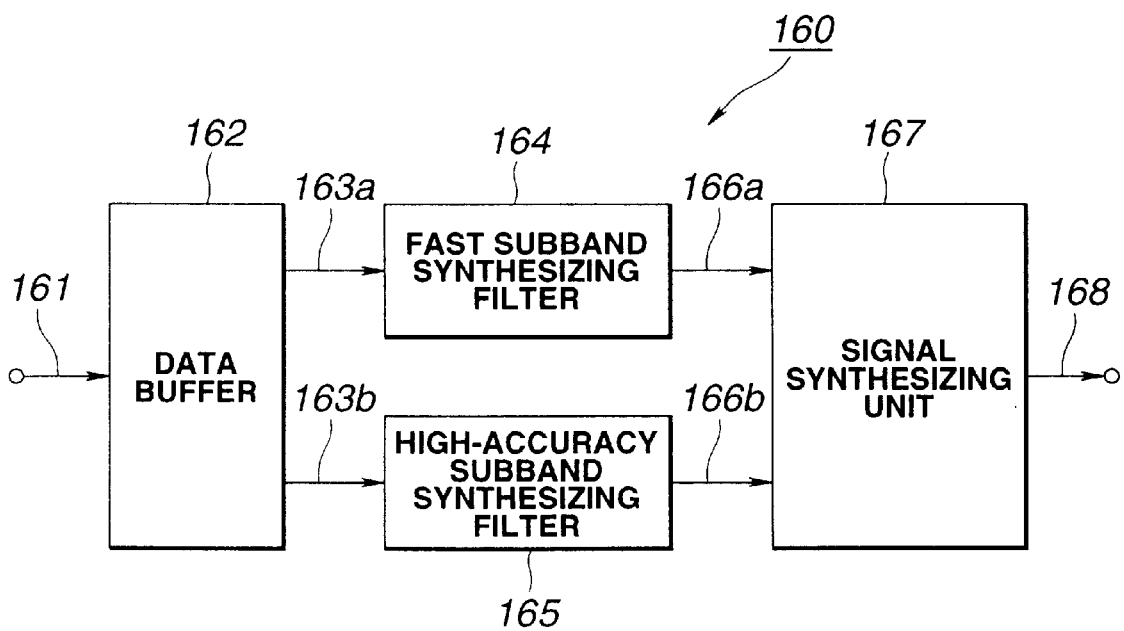
FIG. 16 is a block diagram showing a subband synthesizing filter according to the present invention.

FIG. 16 is a block diagram showing a subband synthesizing filter according to the present invention. The subband synthesizing filter 160 shown in FIG. 16 includes a data buffer 162 for temporarily storing an input sample 161, a fast subband synthesizing filtering unit 164 to which the data 163a of the data buffer 162 is supplied, a high-accuracy subband synthesizing filtering unit 165 to which the data 163b of the data buffer 162 is supplied, and a signal synthesizing unit 167 for synthesizing the output 166a of the fast subband synthesizing filtering unit 164 with the output 166b of the high-accuracy subband synthesizing filtering unit 165. A numeral 168 denotes an output of the signal synthesizing unit 167.

The high-accuracy subband synthesizing filtering unit 165 operates to perform the same process as the process about the data 93a from the N/M-length data buffer 92a executed by the N-length products summing unit 94a in the lowest area that is important to the acoustic sense. This process is a simple sum of products with a length of N. As described above, this filtering unit is not required to store the result on the way of the operation in the data buffer 162. Hence, even relatively smaller hardware allows sufficient operating accuracy to be secured therein.

The fast subband synthesizing filtering unit 165 performs the same process as that shown in FIG. 1 for feeding a sample on another subband, except that the process of the M-length products summing unit 114a shown in FIG. 11 that corresponds to the lowest band area.

In this subband synthesizing filter 160, for processing M output samples, the fast subband synthesizing filtering unit 164 is required to sum ((2K+M) M−M) products. The high-accuracy subband synthesizing filtering unit 165 is required to sum 2KM products. The signal synthesizing unit 167 is required to do M additions. The total number of operations to be done for one sample is (((2K+M)M−M)+2KM+M)/M=(4K+M). These operations are executed for keeping the accuracy required for each subband in synthesizing the subbands. For example, for M=4 and N=128, K=16 is given. Hence, the method shown in FIG. 9 needs to sum 128 products, while the method shown in FIG. 16 just needs to sum only 68 products.

In the arrangements shown in FIGS. 15 and 16, the subband to be processed by the high-accuracy band dividing filtering unit or the high-accuracy subband synthesizing filtering unit is fixed to the lowest area. The subband may be variable according to the quality of the signal. In general, the masking effect is effective in the subband where the signal level is high. Hence, it is unlikely that even somewhat worse operating accuracy brings about noises. On the other hand, in the subband where the signal level is low, the masking effect is not so effective. Hence, it is likely that the bit worse operating accuracy brings about noises.

Figure 17:
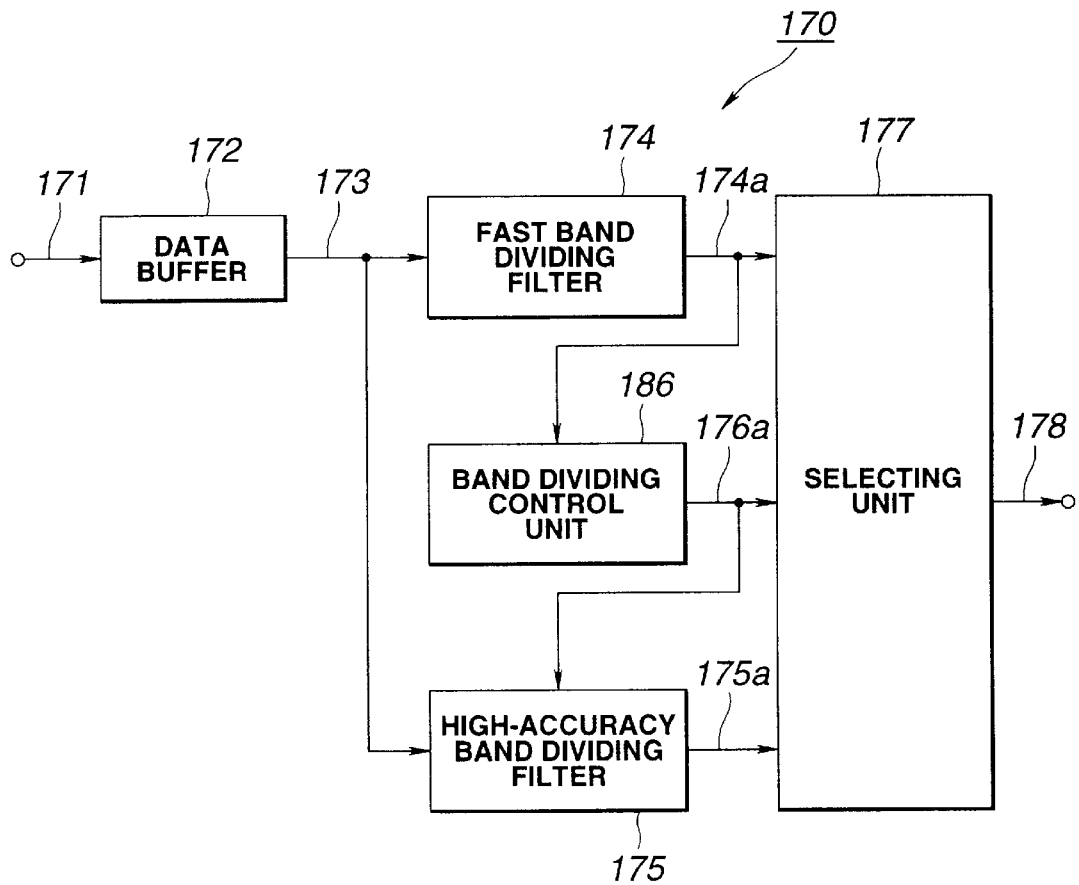
FIG. 17 is a block diagram showing another band dividing filter according to the present invention.

FIG. 17 is a block diagram showing another band dividing filter according to the present invention. The band dividing filter shown in FIG. 17 includes a data buffer 172 for temporarily storing an input sample 171, a fast band dividing filtering unit 174 and a high-accuracy band dividing filtering unit 175 to which the data 173 of the data buffer 172 is supplied, a band dividing control unit 176 for deriving a signal level of each subband based on the output result 174a of the fast band dividing filtering unit 174 and outputting a high-accuracy operating band specifying command 176a for specifying the area of the low signal level and specifying the area where the high-accuracy operation is to be done, and a selecting unit 177.

The output result 174a of the fast band dividing filtering unit 174 and the output result 175a of the high-accuracy band dividing filtering unit 175 are supplied to the selecting unit 177. This selecting unit 177 operates to determine the subband where the high-accuracy operation is done, based on the high-accuracy operating band specifying command 176a, discard the output result of the subband where the high-accuracy operation is done from the output result 174a supplied from the fast band dividing filtering unit 174, and select the output result 175*a* of the high-accuracy band dividing filtering unit 175 for the subband of the low signal level. A numeral 178 denotes an output of the selecting unit 177.

In the operation of this band dividing filter 170, therefore, the band dividing control unit 176 operates to derive a signal level of each subband from the output result 7*a* of the fast band dividing filtering unit 174 and generate the high-accuracy operating band specifying command 176*a* for specifying a band area of a low signal level. Hence, the high-accuracy band dividing filtering unit 175 performs the highly accurate operation for the band division for the subband of the low signal level specified by the command 176*a*.

The selecting unit 177 receives the output results 174*a* of all the subbands from the fast band dividing filtering unit 174. The selecting unit 177 operates to discard the output result of the subband of the low signal level specified by the command 176*a* from the output results 174*a* of all the subbands. And, the selecting unit 177 selects the output result 175*a* of the high-accuracy band dividing filtering unit 175 in the subband of the low signal level.

The high-accuracy band dividing filtering unit 175 performs a normalizing operation with an upper limit value of the absolute value of the signal level before doing the calculation. Hence, this operation makes it possible to do a highly accurate process with a short operating word length.

Figure 18:
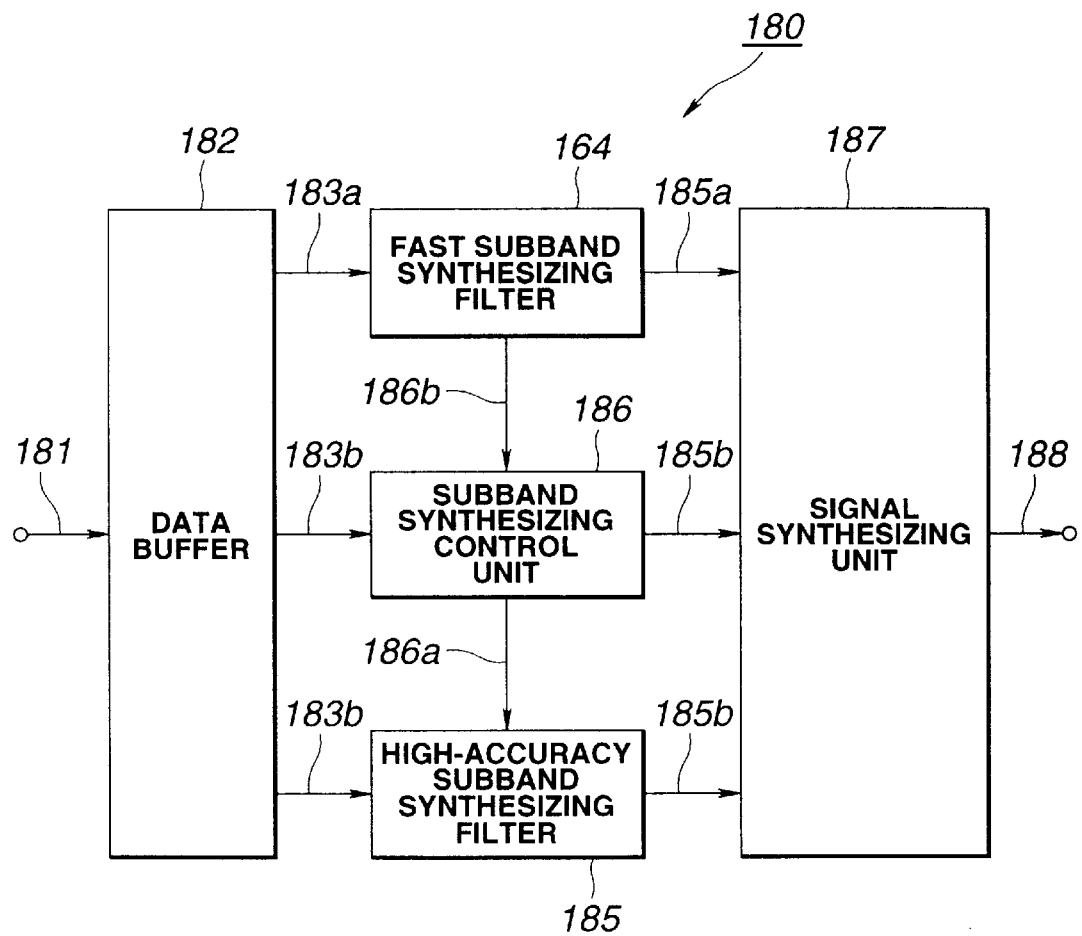
FIG. 18 is a block diagram showing another subband synthesizing filter according to the present invention.

FIG. 18 is a block diagram showing another subband synthesizing filter according to the present invention. This subband synthesizing filter 180 includes a data buffer 182 for temporarily storing an input sample 181, a fast subband synthesizing filtering unit 184 to which the data 183*a* of the data buffer 182 is supplied, a high-accurate subband synthesizing filtering unit 185 to which the data 183*b* of the data buffer 182 is supplied, a subband synthesizing control unit 186 to which the data 183*c* of the data buffer 182 is supplied, and a signal synthesizing unit 187 for synthesizing the output 184*a* of the fast subband synthesizing filtering unit 184 with the output 185*a* of the high-accuracy subband synthesizing filtering unit 185. A numeral 188 denotes an output of the signal synthesizing unit 187.

The subband synthesizing control unit 186 operates to derive a signal level of each subband based on the data 183*c* of the data buffer 182 and determine the subband of the low signal level. Then, the subband synthesizing control unit 186 operates to supply a low signal level subband specifying command 186*a* for specifying a subband of a low signal level to the high-accuracy subband synthesizing filter 185 so that the highly accurate operation is done about the specified subband of the low signal level by the filter 185. Further, the subband synthesizing control unit 186 operates to supply a non-low signal level subband specifying command 186 for specifying the other subbands rather than the subband of the low signal level to the fast subband synthesizing filtering unit 184. The fast operation is done for the other subbands by the fast subband synthesizing filtering unit 184.

The signal synthesizing unit 187 operates to synthesize the operated output 184*a* supplied from the fast subband synthesizing filtering unit 184 with the operated output 185*a* supplied from the high-accurate subband synthesizing filtering unit 185.

Like the arrangement shown in FIG. 16, this subband synthesizing filter 180 may be arranged to replace the input to the subband synthesizing filtering unit 184 with a value of 0 in the subband where the process is done by the high-accuracy subband synthesizing filtering unit 185. The sum of products corresponding to the replaced portion may be eliminated from the operation of the filter 180. The high-accuracy subband synthesizing filtering unit 185 performs a normalizing process with an upper limit value of an absolute value of a signal level before doing the calculation. This process makes it possible to execute a highly accurate process with a short operating word length.

FIG. 19 is a flowchart showing a process of the band dividing filter shown in FIG. 17 realized by the filter coefficient operating unit shown in FIG. 12. The process shown in FIG. 19 is executed to determine whether or not the level inside of the subband is less than a given threshold value level Ri at a step S303. If it is less than the given threshold value level Ri, at a step S304, the high-accuracy operation is done. In all the subbands where the signal level is less than the given threshold value level Ri, the high-accuracy operation is done.

Figure 20:
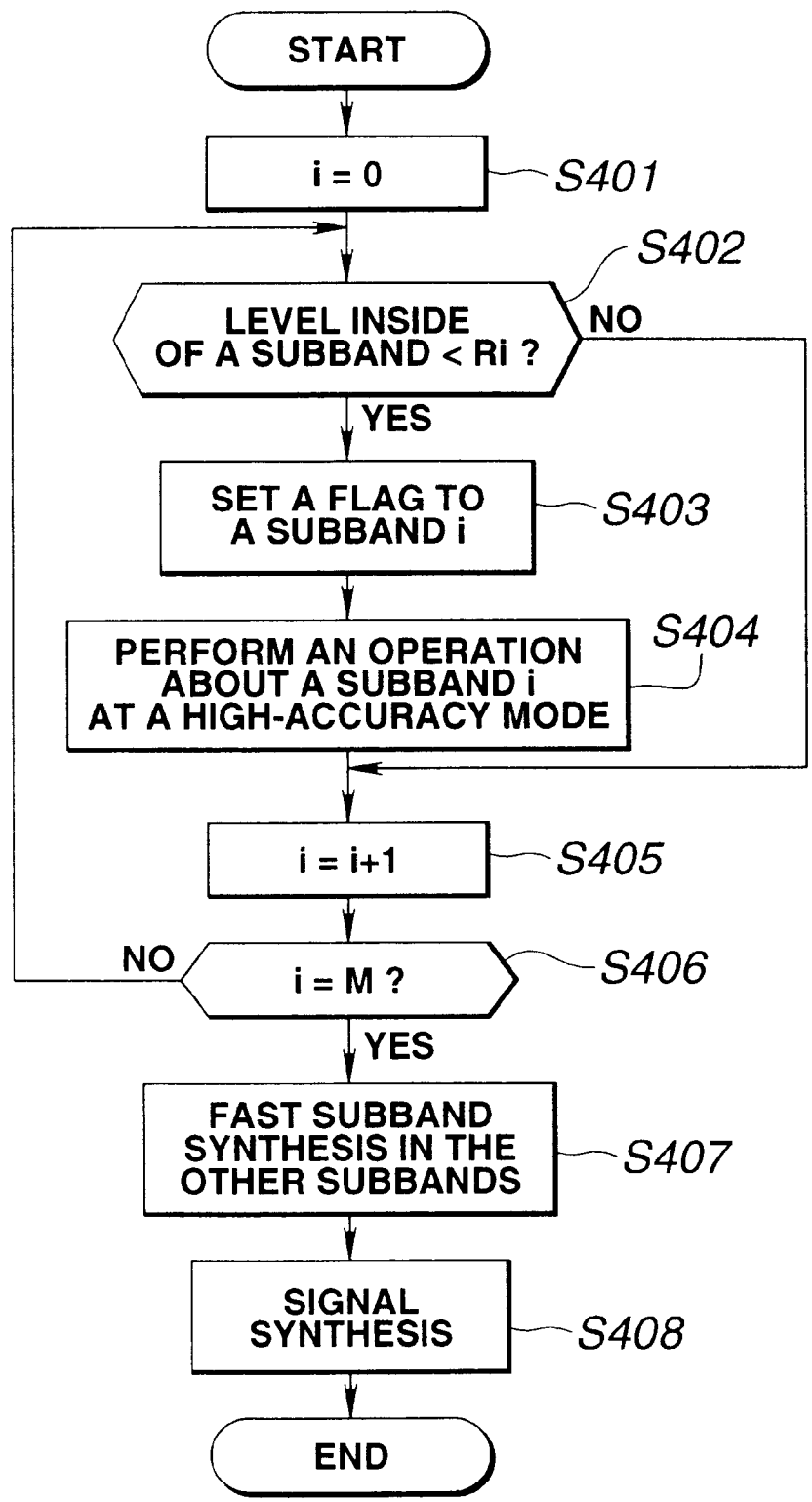
FIG. 20 is a flowchart showing a process of the subband synthesizing filter shown in FIG. 18 realized by the unit for doing a filtering operation according to the present invention.

FIG. 20 is a flowchart showing a process of the subband synthesizing filter shown in FIG. 18 realized by the filtering unit shown in FIG. 12. The process shown in FIG. 20 is executed to determine whether or not the signal level inside of each subband is less than a given threshold value level Ri at a step S402, set a flag to the subband where the signal level inside of the band at a step S403 and perform a highly accurate operation with respect to the subband where the signal level is less than the given threshold value level Ri at a step S404. It means that the highly accurate operation is executed with respect to all the subbands where the signal level is less than a given threshold level Ri. At a step S407, the subband where the flag is set is assumed to have a value of 0 applied thereto and the fast subband synthesizing process is executed for the subband.

In the foregoing description, the high-accuracy band dividing filter or the high-accuracy subband synthesizing filter has ben arranged in another manner rather than the fast band dividing filter or the fast subband synthesizing filter. The method of this invention makes it possible for the fast band dividing filter or the fast subband synthesizing filter to include a highly accurate process for one or some of the subbands. For example, in FIG. 10, by shortening the operation word length of each M-length products summing unit denoted by the numerals 108*b* to 108*d*, it is possible to secure the accuracy for the subband that needs the highly accurate operation.

Further, even these methods and devices may enhance the operating accuracy not only in the lowest area but in the subband of the low signal level. In this case, before doing the operation, the normalization is executed with the upper limit value of an absolute value of the signal level. This makes it possible to do a highly accurate operation with a short operation word length.

In order to enhance the operation accuracy, it is possible to make the operation word length longer or divide the upper bit side and the lower bit side into plural parts for doing an operation for each part and synthesize the operated results into one. The method and the device according to the present invention makes it possible to reduce the overall hardware scale in size and is effective in doing so if the process is executed by using a memory of a relatively long word length for storing a result on the way of the operation so that it may be used in the operation at the next stage and a memory of a relatively short word length for storing the operated result or the result on the way of the operation to be repetitively used later.

The foregoing description has been oriented to the arrangement where after the band division, the spectrum transform is done for coding the spectrum or the decoded spectrum is reversely spectrum-transformed for synthesizing the subbands into the band. The method and the device of this invention may apply to the process of directly coding the band-divided samples without doing the spectrum transform or the process of synthesizing the samples decoded at each subband without doing the spectrum reverse transform into the original band.

Figure 21:
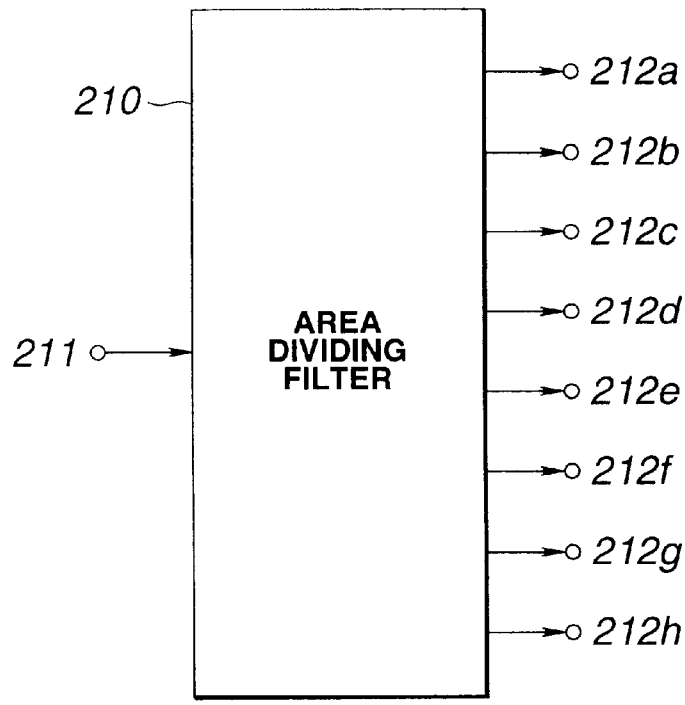
FIG. 21 is an explanatory view showing an embodiment of another transform unit to which the present invention may apply.

FIG. 21 shows the transform unit shown in FIG. 1 arranged by only the band dividing filter. In FIG. 21, an input signal 211 of the band dividing filter 210 corresponds to an input waveform signal 1a of the transform unit 10 shown in FIG. 1. The output signals 212a to 212h of the corresponding subbands of the band dividing filter 210 correspond to the spectrum signal components 10a to 10d of the corresponding subbands that are the output signals of the corresponding subbands.

Figure 22:
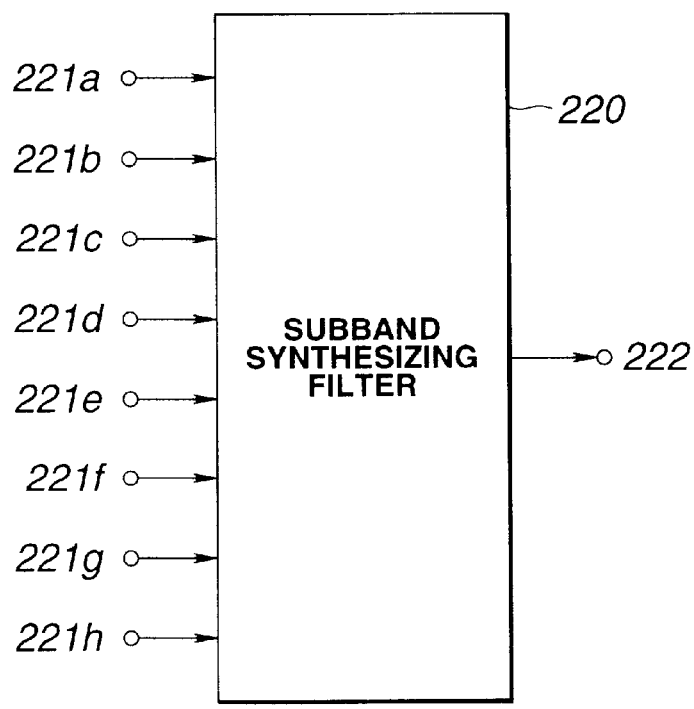
FIG. 22 is an explanatory view showing an embodiment of another reverse transform unit to which the present invention may apply.

FIG. 22 shows the reverse transform unit shown in FIG. 4 arranged by only the subband synthesizing filter. The input signals 221a to 22h of the subband synthesizing filter 220 correspond to the signal component decoding signals 50a to 50d of the corresponding subbands that are the input signals of the reverse transform unit 60. The output signal 222 of the subband synthesizing filter 220 corresponds to the acoustic signal 2a that is an output signal of the reverse transform unit 60 shown in FIG. 4.

The description has been oriented to the application of the present invention to the acoustic waveform signal. The method and the device according to the invention may apply to another kind of signal. For example, it may apply to a picture signal. In particular, for the acoustic signal, the method of this invention may effectively apply to it, because the necessary operating accuracy is greatly variable depending on the subbands from a view of an acoustic sense.

As is obvious from the foregoing description, the method and the device of this invention enable to keep the accuracy of the filtered result sufficiently secured for the subband that needs the operating accuracy as keeping the word length of the memory short as well as reduce the amount of operation in the other subbands. Hence, the present invention makes it possible to realize a coding and a decoding processes as keeping sufficiently high sound quality with a small hardware amount.

What is claimed is:

1. A band dividing filter to transform an input signal waveform into a plurality of subband samples, the band dividing filter including:
   a first, N-length, data buffer for storing an N-length sampled portion of the input signal waveform;
   a plurality of N/M length products summing units that each perform a sum of products on a separate subband of the sampled portion, where M is less than N and is evenly divisible into N;
   a second data buffer for storing the summed products; and
   a plurality of M-length products summing units that each perform a sum of products on the summed products stored in the second data buffer to each generate a separate subband sample.

2. The band dividing filter of claim 1, and combined with:
   forward spectrum transforming circuitry to generate spectrum signal components of the separate subbands responsive to the subband samples.

3. A band dividing filter to transform an input signal waveform into a plurality of subband samples, the band dividing filter including:
   a first data buffer to temporarily hold a sampled portion of the input signal waveform;
   a fast-band dividing filter configured to perform a sum of products for a particular subband of the held sampled portion without storing intermediate results of the products summing into the data buffer, to generate a first sample; and
   a high-accuracy band dividing filter that includes circuitry to perform sums of products on remaining subbands of the input signal waveform, other than the particular subband, to generate a plurality of second samples, the high-accuracy band dividing filter including:
     a plurality of N/M length products summing units to each perform a sum of products on separate ones of the remaining subbands;
     a second data buffer for storing the summed products;
     a plurality of M-length products summing units to each perform a sum of products on the summed products stored in the M-length data buffer to each generate a separate sample.

4. The band-dividing filter of claim 3, combined with:
   forward spectrum transforming circuitry to generate spectrum signal components of the subbands responsive to the samples generated by the fast subband diving filter and to the samples generated by the M-length products summing units of the high-accuracy subband dividing filter.

5. A band dividing filter to transform an input signal waveform into a plurality of M corresponding subbands, the band dividing filter including:
   a data buffer for temporarily holding an input sample;
   a fast-band dividing filter configured to perform a sum of products for the sub-bands of the input signal waveform without storing intermediate results of the products summing into the data buffer, to generate a first sample;
   a band dividing control unit configured to determine a signal level for each subband based on output results of the fast-band dividing filter and to generate a high-accuracy operating band specifying command responsive to the determined signal levels;
   a high-accuracy band dividing filter that includes circuitry to perform sums of products on at least one sub-band of the input signal waveform specified by the high-accuracy operating band specifying command; and
   a selecting unit configured to select, as output of the transform unit, the output of the high-accuracy band dividing filter and, for subbands of the input waveform signal other than the subband specified by the high-accuracy operating band specifying command, the output of the fast sub-band dividing filter.

6. The band dividing filter of claim 5, and combined with:
   forward spectrum transforming circuitry to generate spectrum signal components of the M sub-bands responsive to the samples generated by each of the M M-length products summing units.

7. The transform unit of claim 5, wherein the high-accuracy band dividing filter includes:
   a plurality of summing units, each to perform a sum of products on separate ones of the remaining subbands;
   an M-length data buffer to store the summed products; and
   a plurality of M-length products summing units each to perform a sum of products on the summed products stored in the M-length data buffer, each to generate a separate sample.

8. A band synthesizing filter to synthesize a plurality of subband samples of an acoustic signal into an output signal waveform, the synthesizing filter comprising:

a first data buffer to store the subband samples;

a plurality of M-length products summing units each to perform a sum of products of the separate subbands;

a second, N-length, data buffer to store the summed products;

a plurality of N/M length products summing units to perform a sum of products on the stored summed products; and a switching unit that provides the results of the summed products as the output signal waveform.

9. The band synthesizing filter of claim 8, and combined with:

reverse spectrum transforming circuitry to transform spectrum signal components of subbands to the subband samples.

10. A band synthesizing filter to synthesize a plurality of subband samples of an acoustic signal into an output waveform, the band synthesizing filter including:

a first data buffer to temporarily hold the subband samples;

a fast subband synthesizing filter configured to perform a sum of products for a particular subband of the plurality of subbands without storing intermediate results of the products summing into the data buffer, to generate a first products sum; and a high-accuracy subband synthesizing filter that includes circuitry to perform sums of products on remaining subbands of the plurality of subbands, other than the particular subband, to generate a plurality of second products sums, the high-accuracy band dividing filter including:

a plurality of M-length products summing units each to perform a sum of products of the separate subbands;

a second, N-length, data buffer to store the summed products; and a plurality of N/M length products summing units to perform a sum of products on the stored summed products; and a signal synthesizing unit to synthesize the first products sum with the second products sums to generate the output waveform.

11. The band synthesizing filter of claim 10, and combined with:

reverse spectrum transforming circuitry to transform spectrum signal components of subbands to the subband samples.

12. A band synthesizing filter to synthesize a plurality of subband samples of an acoustic signal into an output waveform, the band synthesizing filter including:

a first data buffer to temporarily hold the subband samples;

a fast subband synthesizing filter configured to perform a sum of products for a particular subband of the plurality of subbands without storing intermediate results of the products summing into the data buffer, to generate a first products sum; and a band synthesizing control unit configured to determine a signal level for each subband based on the subband samples in the first data buffer and to generate a high-accuracy operating band specifying command responsive to the determined signal levels;

a high-accuracy subband synthesizing filter that includes circuitry to perform sums of products on at a plurality of subbands of the subband samples specified by the high-accuracy operating band specifying command, to generate a plurality of second products sums; and a selecting unit configured to select, as output of the transform unit, the output of the high-accuracy band synthesizing filter and, for subbands of the input waveform signal other than the subband specified by the high-accuracy operating band specifying command, the output of the fast sub-band synthesizing filter.

13. The band synthesizing filter of claim 12, and combined with:

reverse spectrum transforming circuitry to transform spectrum signal components of subbands to the subband samples.

14. The transform unit of claim 12, wherein the high-accuracy band synthesizing filter includes:

a plurality of M-length products summing units each to perform a sum of products of the separate subbands;

a second, N-length, data buffer to store the summed products; and a plurality of N/M length products summing units to perform a sum of products on the stored summed products.

* * * * *